(12) United States Patent
Tashiro

(10) Patent No.: US 12,342,049 B2
(45) Date of Patent: Jun. 24, 2025

(54) SERVER AND METHOD

(71) Applicant: 17LIVE Japan Inc., Tokyo (JP)

(72) Inventor: Nagisa Tashiro, Tokyo (JP)

(73) Assignee: 17LIVE Japan Inc., Tokyo (JP)

( * ) Notice: Subject to any disclaimer, the term of this patent is extended or adjusted under 35 U.S.C. 154(b) by 127 days.

(21) Appl. No.: 18/453,895

(22) Filed: Aug. 22, 2023

(65) Prior Publication Data

US 2023/0396851 A1 Dec. 7, 2023

Related U.S. Application Data

(63) Continuation of application No. 17/868,028, filed on Jul. 19, 2022, now Pat. No. 11,778,278.

(30) Foreign Application Priority Data

Dec. 27, 2021 (JP) .................. 2021-212061

(51) Int. Cl.
*H04N 21/2187* (2011.01)
*H04N 21/433* (2011.01)
*H04N 21/4784* (2011.01)

(52) U.S. Cl.
CPC ..... *H04N 21/4784* (2013.01); *H04N 21/2187* (2013.01); *H04N 21/4334* (2013.01)

(58) Field of Classification Search
None
See application file for complete search history.

(56) References Cited

U.S. PATENT DOCUMENTS

| | | | |
|---|---|---|---|
| 10,898,815 B1* | 1/2021 | Jia | H04N 21/2668 |
| 11,330,346 B1* | 5/2022 | Duraiswamy | H04N 21/432 |
| 2018/0007394 A1 | 1/2018 | Li | |
| 2020/0099960 A1 | 3/2020 | Yu | |
| 2020/0204871 A1 | 6/2020 | Bai | |
| 2021/0266631 A1 | 8/2021 | Geng | |
| 2022/0141521 A1 | 5/2022 | Lin | |

FOREIGN PATENT DOCUMENTS

| | | |
|---|---|---|
| CN | 106101736 A | 11/2016 |
| CN | 106658033 A | 5/2017 |
| CN | 110418207 A | 11/2019 |

(Continued)

OTHER PUBLICATIONS

"Rule for Army—17Live"—1 pg. URL: https://17.live/en-US/army/about-%22Liver%20Army%22.

(Continued)

*Primary Examiner* — William J Kim
(74) *Attorney, Agent, or Firm* — Pillsbury Winthrop Shaw Pittman, LLP

(57) ABSTRACT

A server includes a relay unit relaying video data related to a live-stream from a user terminal where the video data is generated to a user terminal where the video data is reproduced, a generation unit generating electronic data based on a part of the live-stream recorded in accordance with an instruction by a user of the user terminal where the video data is generated while the video data is reproduced; and a reception unit receiving a designation of the generated electronic data by a user of the user terminal where the video data is reproduced while the video data is reproduced.

8 Claims, 22 Drawing Sheets

(56) References Cited

FOREIGN PATENT DOCUMENTS

| | | | | |
|---|---|---|---|---|
| CN | 111107384 A | | 5/2020 | |
| CN | 112261433 A | | 1/2021 | |
| CN | 108574879 A | | 2/2021 | |
| CN | 113727125 A | * 11/2021 | ............... | G06T 7/10 |
| JP | 2021-158612 A | | 10/2021 | |
| KR | 20200014487 A | * 2/2020 | ............ | G06V 20/47 |
| WO | 2018/113648 A1 | | 6/2018 | |
| WO | 2018/149176 A1 | | 8/2018 | |
| WO | 2023/005697 A1 | | 2/2023 | |
| WO | 2023/045973 A1 | | 3/2023 | |

OTHER PUBLICATIONS

"Actually easy! How to convert a photo into an illustration or painting style with Photoshop", with English translation (105 pgs.) URL: https://design-trekker.jp/design/photoshop/turn-photos-into-illustrations/.

* cited by examiner

| Stream ID | Distributor ID | Viewer ID |
|---|---|---|
| ST22 | 001A | SS5, SS12, SS43 |
| ST92 | 002B | TT3, TS2 |

| Distributor ID | Army ID |
|---|---|
| 001A | SS20, SS59 |
| 002B | KK1 |

| User ID | Points | Special Gift ID | Special Gift Data | Special Gift Expiration Date | Special Gift Giver ID | Special Gift Recipient ID |
|---|---|---|---|---|---|---|
| 001A | 3243 | SPG01 | xxx.jpg | 2021/12/31 | SS5 | 001A |
| 002B | 2510 | SPG02 | yyy.mp4 | 2022/1/31 | SS12 | 002B |
| SS5 | 1803 | SPG01 | xxx.jpg | 2021/12/31 | SS5 | 001A |
| SS12 | 1305 | | | | | |

| Gift ID | Given Points | Normal/Special | Gift Algorithm |
|---|---|---|---|
| TT01 | 100 | Normal | NA |
| TE01 | 200 | Normal | NA |
| TD01 | 3000 | Special | AAA |
| VE01 | 4000 | Special | BBB |
| VD01 | 2000 | Special | CCC |
| SKK1 | 3000 | Special | DDD |
| SKK3 | 10000 | Special | EEE |
| SKK4 | 1000 | Special | FFF |
| SKK5 | 1000 | Special | GGG |
| SPG01 | 3000 | Special | HHH |

SERVER AND METHOD

CROSS-REFERENCE TO RELATED APPLICATIONS

This application is a Continuation Applications of U.S. Ser. No. 17/868,028, filed on Jul. 19, 2022, which claims the benefit of priority from Japanese Patent Application Serial No. 2021-212061 (filed on Dec. 27, 2021), the contents of which are hereby incorporated by reference in its entirety.

TECHNICAL FIELD

The present disclosure relates to a server and a method.

BACKGROUND

With the development of information technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video distribution services also become popular as storage costs were reduced.

Nowadays, with the sophistication of smartphones and further improvements in network speed as typified by SG, services that enable real-time communication through video, especially live-stream services, are gaining recognition. The number of users of live-stream services is expanding, especially among young people, as such services allow people to share fun moments even when they are in the separate locations from each other.

Japanese Patent Application Publication No. 2021-158612 describes a technique in which the most exciting parts of a live broadcast video are determined, cutting out those parts to make a short video, and providing that short video to viewers who are looking for live broadcast that they should watch, thereby helping them select a live video to watch.

Gifts, such as coins, may help live-streamers engage more with viewers. If a wide variety of gifts is offered and each gift can be elaborately designed, those gifts may make live-streams more exciting.

Conventional gifts used in live-streams are provided by the platform so that gifts selectable by viewers become the same for any live-streams. However, since it is impossible to know in advance the contents of live-streams, there may be a case in which the gifts prepared by the platform are not sufficient to meet demands from the live-streamers and viewers. It is desired to create a gifting system suitable for live-streaming.

SUMMARY

In view of the above, one object of the present disclosure is to provide a technology that can realize gifting designed in consideration of the nature of live-streaming.

One aspect of the invention relates to a server. The server includes: a relay unit relaying video data related to a live-stream from a user terminal where the video data is generated to a user terminal where the video data is reproduced; a gift generation unit generating a gift based on a part of the live-stream recorded while the video data is reproduced; and a processing unit performing processing for giving the generated gift to a distributor of the live-stream while the video data is reproduced.

Another aspect of the invention relates to A non-transitory computer-readable storage medium storing a program. The non-transitory computer-readable storage medium storing a program for causing a terminal to: receive an instruction from a user to record a part of a live-stream while video data related to the live-stream is reproduced; and show a gift on a display while the video data is reproduced, the gift being generated based on the recorded part of the live-stream.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

Advantageous Effects

According to the aspects of the present disclosure, gifting adapted to the nature of live-streaming can be realized.

BRIEF DESCRIPTION OF THE DRAWINGS

FIG. 5 is a data structure diagram of an example of a stream DB in FIG. 4.

FIG. 6 is a data structure diagram of an example of an army DB in FIG. 4.

FIG. 7 is a data structure diagram showing an example of a user DB in FIG. 4.

FIG. 8 is a data structure diagram showing an example of a gift DB in FIG. 4.

DESCRIPTION OF THE PREFERRED EMBODIMENTS

Like elements, components, processes, and signals throughout the Figures are labeled with same or similar designations and numbering, and the description for the like elements will not be hereunder repeated. For purposes of clarity and brevity, some of the components that are less related and thus not described are not shown in Figures.

In a live-streaming system according to an embodiment of the disclosure, distributors and/or viewers are able to generate a gift from a part of a live-stream during the live-streaming. For example, distributors and/or viewers are able to create a gift from a screenshot that captures a certain special moment within the live-stream. Such a gifting system may dramatically increase the originality of the gifting and the engagement between the distributors and the viewers.

<Configuration of Live-Streaming System>

Figure 1:
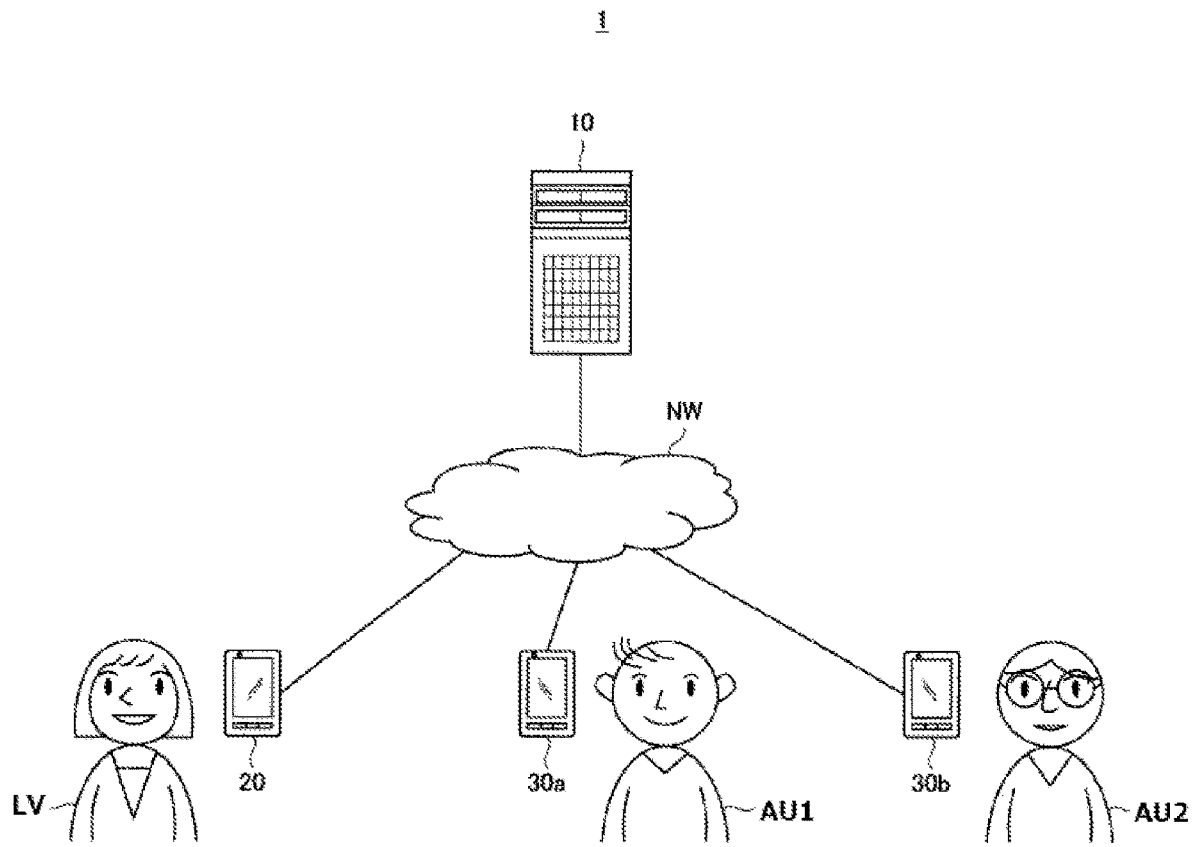
FIG. 1 schematically illustrates a configuration of a live-streaming system in one embodiment of the disclosure.

FIG. 1 schematically illustrates a configuration of a live-streaming system 1 according one embodiment of the disclosure. The live-streaming system 1 provides an interactive live-stream service that allows a distributor LV (also referred to as a liver or streamer) and a viewer AU (also referred to as audience) (AU1, AU2 . . . ) to communicate in real time. As shown in FIG. 1, the live-streaming system 1 includes a server 10, a user terminal 20 on the distributor side, and user terminals 30 (30a, 30b . . . ) on the audience side. The distributor and viewers may be collectively referred to as users. The server 10 may be one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop PCs. The server 10, the user terminal 20, and the user terminal 30 are interconnected so as to be able to communicate with each other over the various wired or wireless network NW.

The live-streaming system 1 involves the distributor LV, the viewers AU, an administrator (not shown) who manages the server 10. The distributor LV is a person who broadcasts contents in real time by recording the contents with his/her user terminal 20 and uploading them directly to the server 1. Examples of the contents may include the distributor's own songs, talks, performances, fortune-telling, gameplays, and any other contents. The administrator provides a platform for live-streaming contents on the server 10, and also mediates or manages real-time interactions between the distributor LV and the viewers AU. The viewer AU accesses the platform at his/her user terminal 30 to select and view a desired content. During live-streaming of the selected content, the viewer AU performs operations to comment and cheer via the user terminal 30, the distributor LV who is delivering the content responds to such a comment and cheer, and such response is transmitted to the viewer AU via video and/or audio, thereby establishing an interactive communication.

The term "live-streaming" may mean a mode of data transmission that allows a content recorded at the user terminal 20 of the distributor LV to be reproduced and viewed at the user terminals 30 of the viewers AU substantially in real time, or it may mean a live broadcast realized by such a mode of transmission. The live-streaming may be achieved using existing live delivery technologies such as HTTP Live Streaming, Common Media Application Format, Web Real-Time Communications, Real Time Messaging Protocol and MPEG DASH. Live-streaming includes a transmission mode in which the viewers AU can view a content with a specified delay simultaneously with the recording of the content by the distributor LV. As for the length of the delay, it may be acceptable for a delay even with which interaction between the distributor LV and the viewers AU can be established. Note that the live-streaming is distinguished from so-called on-demand type transmission, in which the entire recorded data of the content is once stored on the server, and the server provides the data to a user at any subsequent time upon request from the user.

The term "video data" herein refers to data that includes image data (also referred to as moving image data) generated using an image capturing function of the user terminals 20 and 30, and audio data generated using an audio input function of the user terminals 20 and 30. Video data is reproduced in (played on) the user terminals 20 and 30, so that the users can view the contents.

Figure 2:
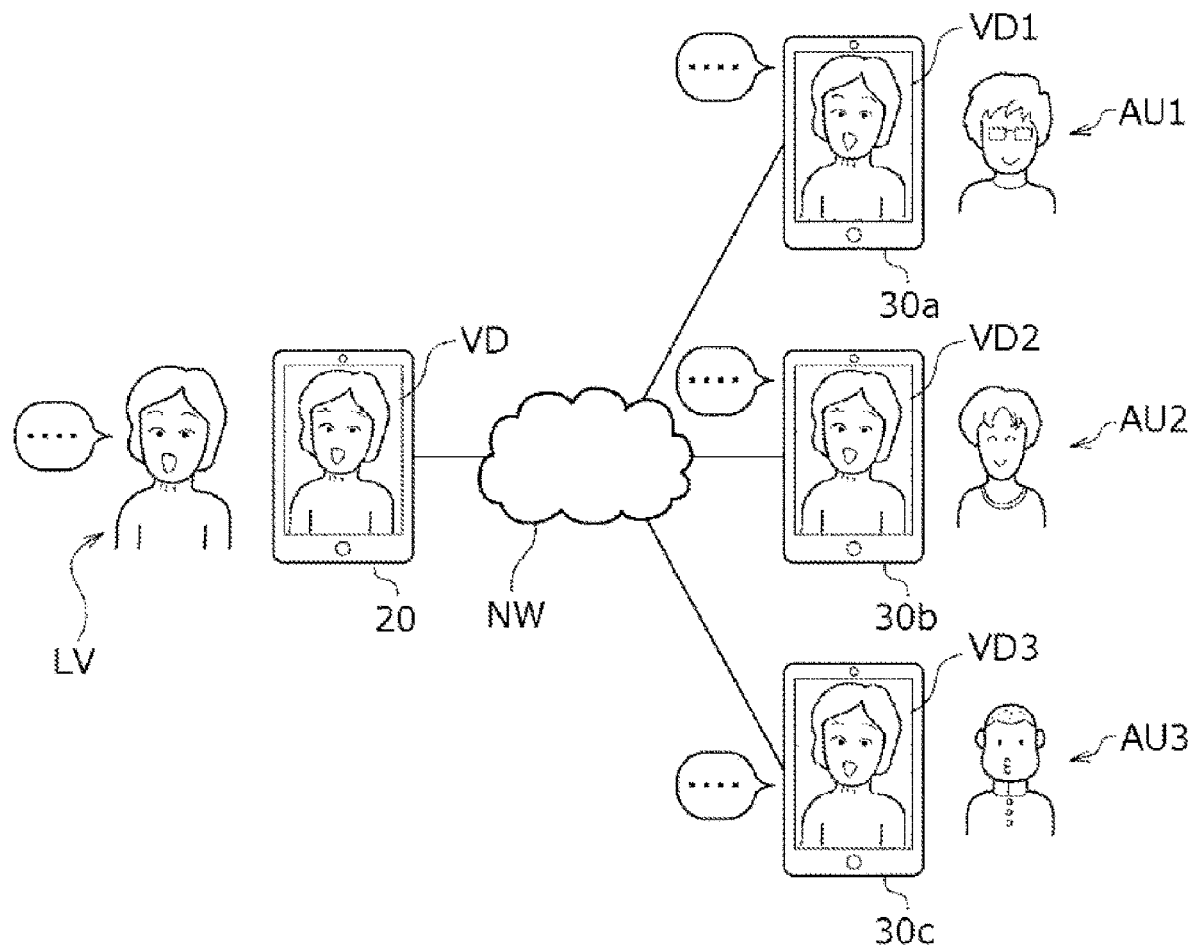
FIG. 2 schematically illustrates an example of live-streaming implemented by the live-streaming system of FIG. 1.

FIG. 2 schematically illustrates an example of live-streaming implemented by the live-streaming system of FIG. 1. In the example in FIG. 2, the distributor LV is live-streaming his/her talk. The user terminal 20 of the distributor LV generates video data by recording images and sounds of the distributor LV talking, and the generated data is transmitted to the server 10 (not shown in FIG. 2) over the network NW. At the same time, the user terminal 20 displays a recorded video image VD of the distributor LV on the display of the user terminal 20 to allow the distributor LV to check the live stream currently performed.

The user terminals 30a, 30b, and 30c of the viewers AU1, AU2, and AU3, respectively, who have requested the platform to view the live-stream of the distributor LV, receive video data related to the live-stream over the network NW and reproduce the received video data to display video images VD1, VD2, and VD3 on the displays and output audio through the speakers ("video-data related to the live-stream" may also be herein referred to as "live-streaming video data"). The videos VD1, VD2, and VD3 displayed at the user terminals 30a, 30b, and 30c, respectively, are substantially the same as the video image VD captured by the user terminal 20 of the distributor LV, and the audio outputted at the user terminals 30a, 30b, and 30c is substantially the same as the audio recorded by the user terminal 20 of the distributor LV.

Recording of the images and sounds at the user terminal 20 of the distributor LV and reproduction of the video data at the user terminals 30a, 30b, 30c of the viewers AU1, AU2, AU3 are performed substantially simultaneously. Once the viewer AU1 types a comment about the talk of the distributor LV on the user terminal 30a, the server 10 displays the comment on the user terminal 20 of the distributor LV in real time and also displays the comment on the user terminals 30a, 30b, and 30c of the viewers AU1, AU2, and AU3, respectively. When the distributor LV read the comment and develops his/her talk to cover and respond the comment, the video and sound of the talk are displayed on the user terminals 30a, 30b, 30c of the viewers AU1, AU2, AU3 respectively. This interactive action is recognized as establishment of a conversation between the distributor LV and the viewer AU1. In this way, the live-streaming system 1 realizes the live-streaming that enables the interactive communication, not one-way communication.

Figure 3:
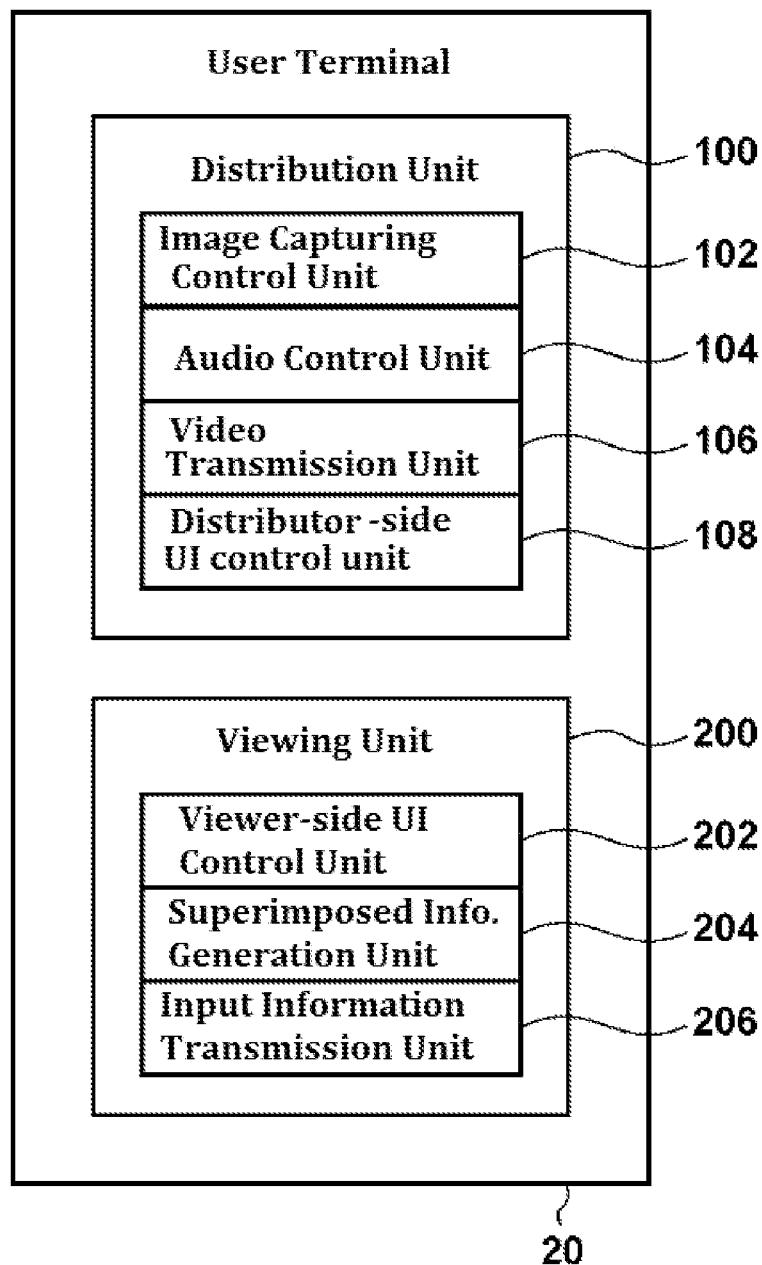
FIG. 3 is a block diagram showing functions and configuration of a user terminal of FIG. 1.

FIG. 3 is a block diagram showing functions and configuration of the user terminal 20 of FIG. 1. The user terminal 30 has the same functions and configuration as the user terminal 20. Each block in FIG. 3 and the subsequent block diagrams may be realized by elements such as a computer CPU or a mechanical device in terms of hardware, and can be realized by a computer program or the like in terms of software. Functional blocks realized by cooperative operation between these elements. Therefore, it is understood by those skilled in the art that these functional blocks can be realized in various forms by combining hardware and software.

The distributor LV and the viewers AU download and install a live-streaming application program (hereinafter referred to as a live-streaming application) according to the embodiment to the user terminals 20 and 30 from a download site over the network NW. Alternatively, the live-streaming application may be pre-installed on the user terminals 20 and 30. When the live-streaming application is executed on the user terminals 20 and 30, the user terminals 20 and 30 communicate with the server 10 over the network NW to implement various functions. Hereinafter, the functions implemented by the user terminals 20 and 30 (processors such as CPUs) in which the live-streaming application is run will be described as functions of the user terminals 20 and 30. These functions are realized in practice by the live-streaming application on the user terminals 20 and 30. In any other embodiments, these functions may be realized by a computer program that is written in a programming language such as HTML (HyperText Markup Language), transmitted from the server 10 to web browsers of the user terminals 20 and 30 over the network NW, and executed by the web browsers.

The user terminal 20 includes a distribution unit 100 that generates video data in which the user's image and sound are recorded and provides the video data to the server 10, and a viewing unit 200 to which the video data is provided from the server 10 to reproduce the video data. The user activates the distribution unit 100 when the user performs live-streaming, and activates the viewing unit 200 when the user views a video. The user terminal in which the distribution unit 100 is activated is the distributor's terminal, i.e., the user terminal that generates the video data, and the user terminal in which the viewing unit 200 is activated is the viewer's terminal, i.e., the user terminal is which the video data is reproduced or played.

The distribution unit 100 includes an image capturing control unit 102, an audio control unit 104, a video transmission unit 106, and a distributor-side UI control unit 108. The image capturing control unit 102 is connected to a camera (not shown in FIG. 3) and controls image capturing performed by the camera. The image capturing control unit 102 obtains image data from the camera. The audio control unit 104 is connected to a microphone (not shown in FIG. 3) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time. The distributor-side UI control unit 108 controls an UI for the distributor. The distributor-side UI control unit 108 is connected to a display (not shown in FIG. 3), and displays a video on the display by reproducing the video data that is to be transmitted by the video transmission unit 106. The distributor-side UI control unit 108 displays an operation object or an instruction-accepting object on the display, and accepts inputs from the distributor who taps on the object.

The viewing unit 200 includes a viewer-side UI control unit 202, a superimposed information generation unit 204, and an input information transmission unit 206. The viewer-side UI control unit 202 controls the UI for the viewers. The viewing-side UI control unit 202 is connected to a display and speaker (not shown in FIG. 3), and reproduces the received video data to display video images on the display and output audio through the speaker. The state where the image is outputted to the display and the audio is outputted from the speaker can be referred to as "the video data is played". The viewer-side UI control unit 202 is also connected to input means (not shown in FIG. 3) such as touch panels, keyboards, and displays, and obtains user input via these input means. The superimposed information generation unit 204 superimposes a predetermined frame image on an image generated from the video data from the server 10. The frame image includes various user interface objects (hereinafter simply referred to as "objects") for accepting inputs from the user, comments entered by the viewers, and information obtained from the server 10. The input information transmission unit 206 transmits the user input obtained by the viewer-side UI control unit 202 to the server 10 over the network NW.

Figure 4:
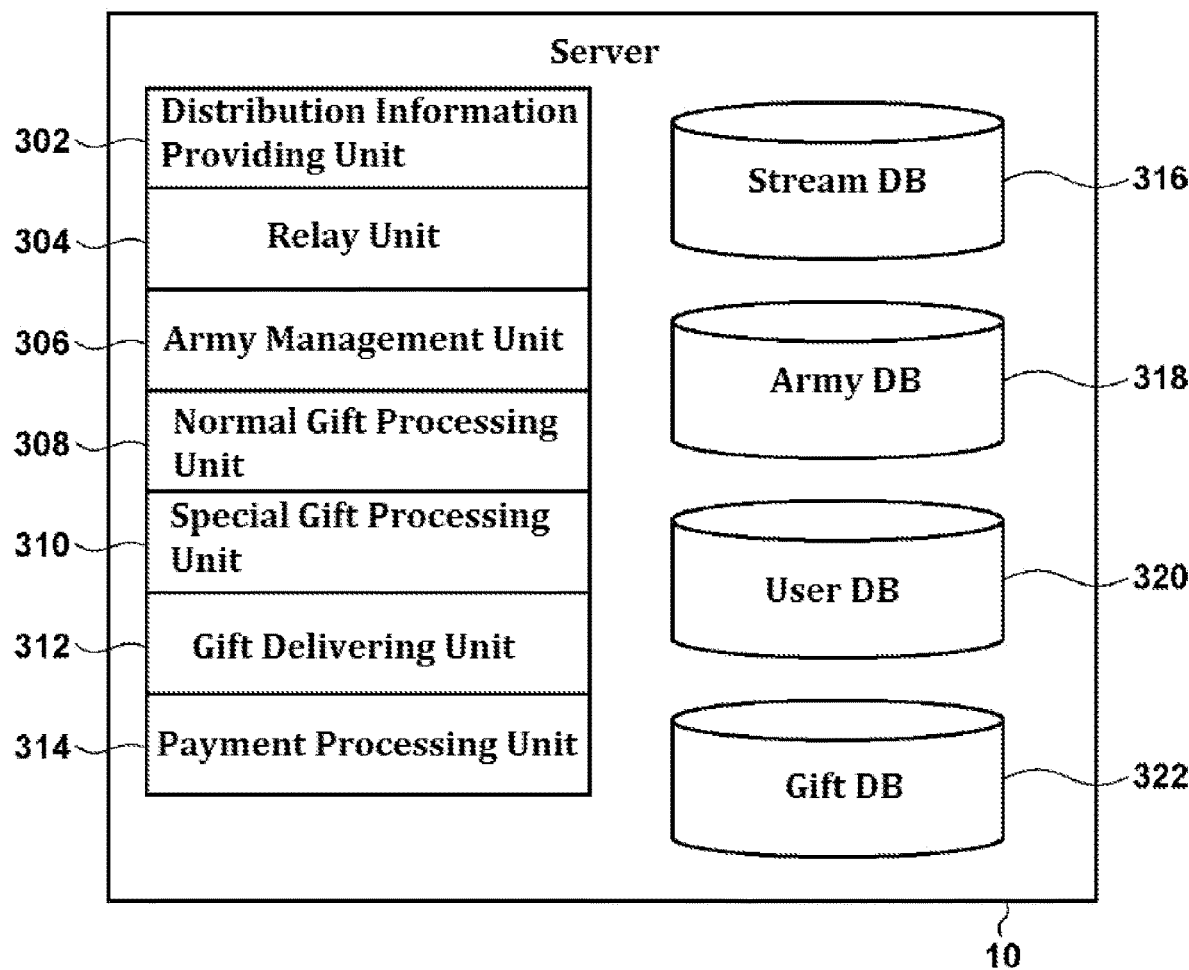
FIG. 4 is a block diagram showing functions and configuration of a server of FIG. 1.

FIG. 4 is a block diagram showing functions and configuration of the server of FIG. 1. The server 10 has a distribution information providing unit 302, a relay unit 304, an army management unit 306, a regular gift processing unit 308, a special gift processing unit 310, a gift delivering unit 312, a payment processing unit 314, a stream DB 316, an army DB 318, a user DB 320, and a gift DB 322.

FIG. 5 is a data structure diagram of an example of the stream DB 316 of FIG. 4. The stream DB 316 holds information regarding a live-stream currently taking place. The stream DB 316 stores a stream ID for identifying a live-stream on a live distribution platform provided by the live-streaming system 1, a distributor ID, which is a user ID for identifying the distributor who provides the live-stream, and a viewer ID, which is a user ID for identifying a viewer of the live-stream, in association with each other.

FIG. 6 is a data structure diagram of an example of the army DB 318 of FIG. 4. The army DB 318 holds information regarding the army of each distributor. The army DB 318 stores the distributor ID of the distributor and an army ID, which is a user ID of the user who is the army of the distributor, in association with each other. The term "army" means a user who has subscribed to a subscription service for a distributor, in other words, a member of the distributor's fan club. If you are a member of the army, you need to pay the administrator a prescribed registration or subscription fee on a regular basis, such as every month or every three months. The distributor receives at least a part of the registration fee from the administrator. When a viewer is army of a distributor, he/she can receive a special gift, a special entry animation, and any other benefits while viewing the distributor's live-stream. The army may be realized by using the technique described in "Liver Army," 17LIVE, URL: https://helpfeel.com/17media-jp/%E3%83%A9%E3%82%A4%E3%83%90%E3%83%BC%E3%82%A2%E3%83%BC%E3%83%9F%E3%83%BC-5d1b19ed60a44d0017857bf6.

FIG. 7 is a data structure diagram showing an example of the user DB 320 of FIG. 4. The user DB 320 holds information regarding users. The user DB 320 stores a user ID for identifying a user, points that the user has, and information about special gifts given to or given by the user, in association with each other. The point is the electronic value circulated within the live-streaming platform. When a distributor receives a gift from a viewer during a live-stream, the distributor's points increase by the value of the gift. The points are used, for example, to determine the amount of reward or money the distributor receives from the administrator of the live-streaming platform.

The information regarding the special gift includes: a special gift ID for identifying a special gift; special gift data, which is image data of the special gift; a special gift expiration date, which is the expiration date of the special gift; a special gift giver ID, which is a user ID of the user (viewer) who presented the special gift; and a special gift recipient ID, which is a user ID of the user (distributor) who has received the special gift. The special gifts will be described later in detail. The expired special gift is deleted from the user DB 320.

FIG. 8 is a data structure diagram showing an example of the gift DB of FIG. 4. The gift DB 322 holds information regarding gifts available for the viewers in the live-streaming. A gift is electronic data with the following characteristics:

It can be purchased in exchange for the points, or can be given for free.

It can be given by a viewer to a distributor.—Giving a gift to a distributor is also referred to as using the gift or throwing the gift.

Some gifts may be purchased and used at the same time, and some gifts may be purchased and then used at any time later by the purchaser viewer.

When a viewer gives a gift to a distributor, the distributor is awarded the amount of points corresponding to the gift and, in some cases, an effect associated with the gift is exerted. For example, an effect corresponding to the gift will appear on the live-streaming screen.

The gift DB 322 stores a gift ID for identifying a gift, the amount of points that are given to a distributor when the gift is given to the distributor, information whether the gift is an ordinary gift or a special gift, and a gift algorithm that specifies the operation or function of the gift when the gift is the special gift, in association with each other. A viewer is able to give a desired gift to a distributor by paying the price or value equivalent to the points given to the distributor for the gift while viewing the live-stream. This payment may be performed by the viewer by an appropriate electronic means of payment, for example, by paying, to the administrator, the amount of points equivalent to the points given to the distributor (e.g., the same amount of points as the points given to the distributor, or the amount of points calculated by multiplying the points given to the distributor by a predetermined factor such as 1.2, or the amount of points calculated by adding predetermined commission points to the points given to the distributor, etc.). Alternatively, bank transfers or credit card payments may be used.

The effects of the special gifts registered in the gift DB 322 of FIG. 8 are listed below. The gift algorithm for each special gift is a software module that is configured to be executed by the CPU of the server 10 or the like to realize the corresponding effect.

TD01: A special gift is generated by allowing a viewer to take a screenshot (obtain a still image) of a live-stream whenever the viewer wishes and embedding the viewer's user ID in the screenshot image.

VE01: A special gift is generated by allowing a viewer to take a screenshot of a live-stream whenever the viewer wishes and converting the screenshot image into an illustration.

VD01: When the total number of viewers of a live-stream of a distributor reaches a milestone (e.g., 1,000 viewers), a special gift is generated from an image of a screenshot of the live-stream that has been automatically taken.

SKK1: A special gift is generated by allowing a distributor to take a screenshot of a live-stream whenever the distributor wishes and embedding a predetermined text into the screenshot image.

SKK3: A special gift is generated by allowing a viewer to short-time record a live-stream whenever the viewer wishes and creating the special gift from the recorded video.

SKK4: A secret gift from a distributor to a viewer.

SKK5: An open gift from a distributor to a viewer.

SPG01: A special gift given to a specific distributor.

Referring again to FIG. 4, the army management unit 306 performs processing related to management of an army, including registration and deregistration to the army, periodic payment of points as compensation for members of the army, and gifting special effects to the army. For example, upon reception of an application from the user terminal 30 on the viewer side for joining an army of a specific distributor, the army management unit 306 updates the army DB 318 such that the viewer ID of the viewer is added to the army ID corresponding to the distributor ID of the specific distributor.

Upon reception of a notification from the user terminal 20 on the distributor side to start a live-stream over the network NW, the distribution information providing unit 302 registers a stream ID for identifying this live-stream and the distributor ID of the distributor who performs the live-stream in the stream DB 316. When the distribution information providing unit 302 receives a request to provide information about live-streams from the viewing unit 200 of the user terminal 30 on the viewer side over the network NW, the distribution information providing unit 302 retrieves currently available live-streams from the stream DB 316 and makes a list of the available live-streams. The distribution information providing unit 302 transmits the list to the requesting user terminal 30 over the network NW. The viewer-side UI control unit 202 of the requesting user terminal 30 generates a live-stream selection screen based on the received list and displays it on the display of the user terminal 30.

Once the input information transmission unit 206 of the user terminal 30 receives the viewer's selection result of the live-stream on the live-stream selection screen, the input information transmission unit 206 generates a distribution request including the stream ID of the selected live-stream, and transmits the request to the server 10 over the network NW. The distribution information providing unit 302 starts providing, to the requesting user terminal 30, the live-stream specified by the stream ID included in the received distribution request. The distribution information providing unit 302 updates the stream DB 316 to include the viewer ID of the viewer of the requesting user terminal 30 into the viewer IDs of the stream ID.

The relay unit 304 relays the video data from the distributor-side user terminal 20 to the viewer-side user terminal 30 in the live-streaming started by the distribution information providing unit 302. The relay unit 304 receives from the input information transmission unit 206 a signal that represents user input by the viewer during reproduction of the video data on the viewer-side user terminal 30. The signal representing the user input may be a gift usage signal. The gift usage signal includes the viewer ID of the viewer, the distributor ID of the distributor to whom the gift is given (the distributor ID of the distributor performing the live-stream that is being viewed by the viewer who gave the present), and the gift ID of the gift. The relay unit 304 refers to the gift DB 322 and determines whether the gift identified by the gift ID included in the received gift usage signal is a normal gift or a special gift.

When the gift identified by the gift ID included in the gift usage signal is a normal gift, the normal gift processing unit 308 updates the user DB 320 so as to increase the points of the distributor depending on the points of the normal gift. Specifically, the normal gift processing unit 308 refers to the gift DB 322 to specify the points to be given for the gift ID included in the received gift usage signal. The normal gift processing unit 308 then updates the user DB 320 to add the determined points to the points of the distributor ID included in the gift usage signal.

When the gift identified by the gift ID included in the gift usage signal is a special gift, the special gift processing unit 310 generates the special gift based on a part of the live-stream recorded during the reproduction of the video data related to the live-stream. In the embodiment, the special gift processing unit 310 is capable of generating the following five types of special gifts.

(1) Paid gifts generated based on a part of a live-stream recorded according to a viewer's instruction (e.g.: TD01, VE01, SKK3)
(2) Paid gifts generated based on a part of a live-stream recorded according to a distributor's instruction (e.g.: SKK1)
(3) Paid gifts generated based on a part of a live-stream automatically recorded on condition that a condition related to the live-stream is satisfied (e.g.: VD01)
(4) Free gifts generated based on a part of a live-stream recorded according to an Army's instruction (the free gifts can be generated without payment)
(5) Paid gifts from a distributor to a specific viewer. (e.g.: SKK4, SKK5)

The above special gifts (1) to (4) will be now described, and the special gift (5) will be described in a modification example.

The gift delivering unit 312 performs processing for giving such a special gift generated by the special gift processing unit 310 to a distributor of the live-stream during reproduction of the video data related to the live-stream. When the special gift is a paid gift, the gift delivering unit 312 performs processing for giving the special gift to a distributor when the gift delivering unit 312 receives an instruction of payment associated with the generated special gift from a viewer. The gift delivering unit 312 performs the following four steps in order to give a special gift to a distributor.

(1) Transmit image data for displaying the special gift to the distributor's user terminal 20 and the viewer's user terminal 30.
(2) Update the user DB 320 so as to increase the points of the distributor depending on the points of the special gift.
(3) Generate special gift information (the special gift ID, special gift data, special gift expiration date, special gift giver ID, special gift recipient ID) for the special gift, and register the information in association with the giver viewer and the recipient distributor in the user DB 320.
(4) Register the special gift ID and the points of the special gift in the gift DB 322.

The payment processing unit 314 processes the viewer's payment of the price or value equivalent to the generated special gift. The equivalent value may be paid in advance, for example, the payment of the value may be received before the special gift is generated, or the equivalent value may be paid after the special gift is generated and before the special gift is given to the distributor. When the payment processing unit 314 receives an instruction of paying the equivalent value for the special gift from a viewer, the payment processing unit 314 updates the user DB 320 to subtract the points of the equivalent value from the points of the viewer.

The payment processing unit 314 processes the viewer's payment of the price or value equivalent to a normal gift. When the gift identified by the gift ID included in the gift usage signal is a normal gift, the payment processing unit 314 updates the user DB 320 to subtract the points of the value equivalent to the normal gift from the points of the viewer identified by the viewer ID included in the gift usage signal.

Figure 9:
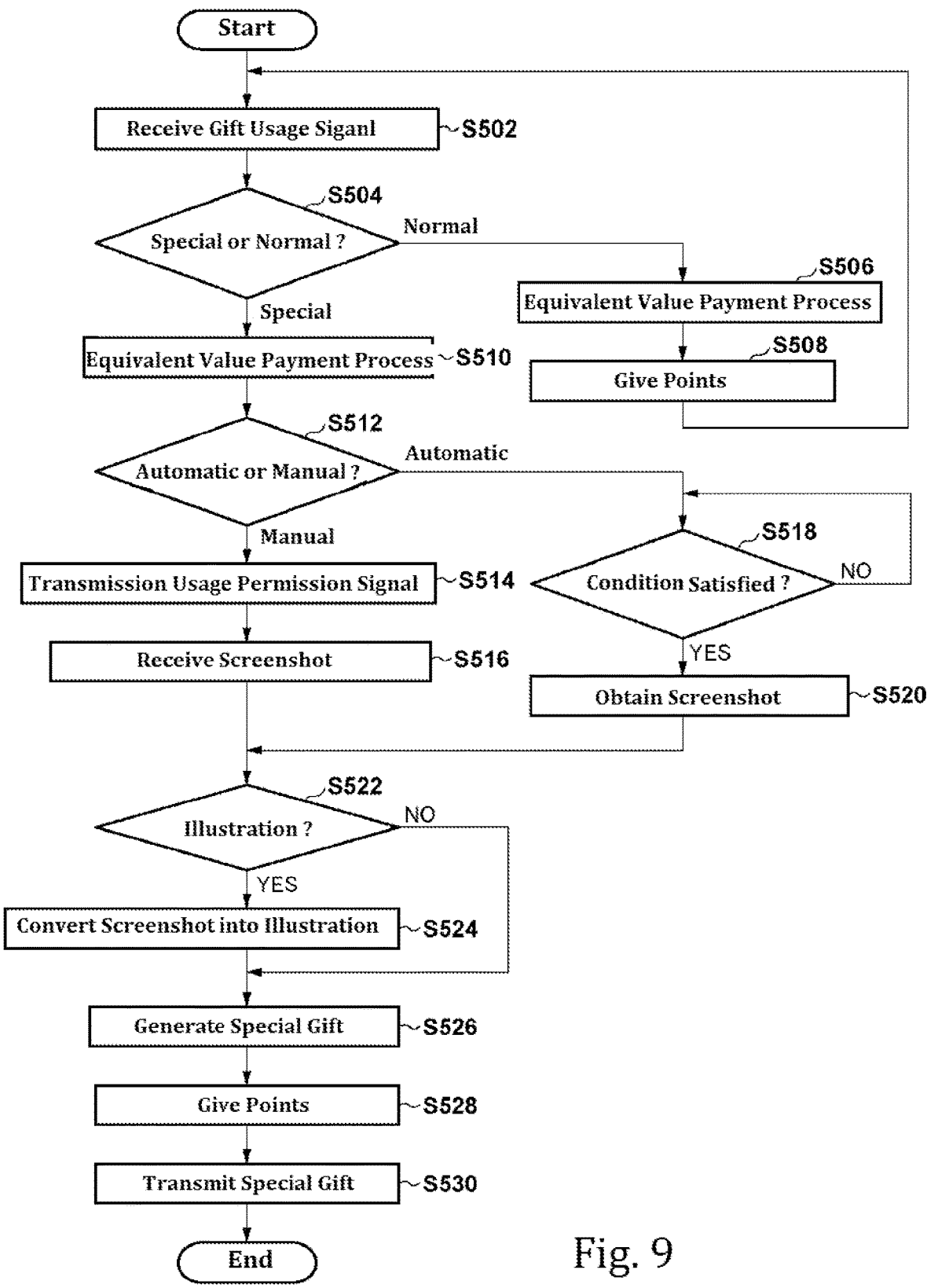
FIG. 9 is a flowchart showing steps of a gift usage process on a server of FIG. 1.

The operation of the live-streaming system 1 with the above configuration will be now described. FIG. 9 is a flowchart showing steps of a gift usage process on the server 10. This example describes usage of a prepaid or free gift generated from a screenshot. In the example, it is assumed that the viewer accesses the live-stream platform from the user terminal 30, selects a desired live-stream on the live-stream selection screen, and starts viewing the selected live-stream. While the viewer is watching the live-stream, the video data is continuously transmitted from the distributor's user terminal 20 to the viewer's user terminal 30 via (the relay unit 304 of) the server 10.

During the reproduction of the video data, the viewer performs user input for requesting display of a gift via input means of the user terminal 30. Upon receipt of this user input, the input information transmission unit 206 of the user terminal 30 generates a gift information request and transmits it to the server 10. Upon receipt of the gift information request, the relay unit 304 of the server 10 refers to the gift DB 322 and specifies usable gift IDs. The relay unit 304 generates a gift information response including the specified gift IDs and transmits it to the user terminal 30. The superimposed information generation unit 204 of the user terminal 30 includes, into the frame image, an image of a usable gift list that lists the gift icon images (hereinafter referred to as gift icons) specified by the gift IDs included in the gift information response. The viewer-side UI control unit 202 displays the video image on which the frame image is superimposed on the display.

Once the viewer-side UI control unit 202 of the user terminal 30 accepts the viewer's selection of the gift, that is, the designation of the gift icon, the input information transmission unit 206 generates the gift usage signal that includes the gift ID of the designated gift, the viewer ID, and the distributor ID, and transmits the gift usage signal to the server 10 over the network NW. The relay unit 304 of the server 10 receives the gift usage signal (S502). The relay unit 304 refers to the gift DB 322 and determines whether the gift identified by the gift ID included in the received gift usage signal is a normal gift or a special gift (S504). When the gift is a normal gift, the payment processing unit 314 performs the payment process (S506). The normal gift processing unit 308 performs processing for giving points to the distributor (S508). The process then returns to step S502.

When the gift is determined as a special gift in step S504, the payment processing unit 314 performs the payment process (S510). The payment processing unit 314 refers to the gift DB 322 and determines whether the special gift identified by the gift ID included in the gift usage signal received in step S502 is a free special gift exclusively given for army. When it is the free special gift exclusively given for army, the payment processing unit 314 refers to the army DB 318 to determine whether the viewer specified by the viewer ID included in the gift usage signal received in step S502 is the army of the distributor specified by the distributor ID included in the same gift usage signal. When it is determined that the viewer is not the army, the payment processing unit 314 generates an error signal and transmits it to the user terminal 30. Upon receipt of the error signal, the viewer-side UI control unit 202 of the user terminal 30 displays a text indicating that the gift cannot be used unless the viewer is army on the display. When it is determined that the viewer is the army, the payment processing unit 314 completes the payment process without changing the viewer's points.

When the special gift specified by the gift ID included in the gift usage signal received in step S502 is not the free special gift exclusively given for army, the payment processing unit 314 updates the user DB 320 such that the points corresponding to the equivalent value or price of the special gift is deducted from the points of the viewer specified by the viewer ID included in the gift usage signal. The equivalent value for the special gift may be the same as the points given to the distributor or may be configured differently.

When the special gift is manually generated (manual in S512), the special gift processing unit 310 generates a usage permission signal that includes the gift ID of the special gift and the part of the gift algorithm corresponding to the special gift that should be executed on the user terminal, and transmits the signal to the user terminal 30 that has transmitted the gift usage signal over the network NW (S514). Upon receipt of the usage permission signal, the viewing unit 200 of the user terminal 30 is allowed to capture a screenshot of the live-stream by executing the part of the gift algorithm included in the usage permission signal. The viewer inputs an instruction at a desired timing. Upon reception of the instruction, the viewing unit 200 captures a screenshot of the live-stream at that time. The input information transmission unit 206 transmits the obtained screenshot data to the server 10 over the network NW. The special gift processing unit 310 receives the data so transmitted (S516).

When the special gift is automatically generated (automatic in S512), the special gift processing unit 310 determines whether a record condition set in association with the special gift is satisfied (S518). The record condition is, for example, that the cumulative number of viewers of the live-stream performed by the distributor reaches a milestone (for example, 1000 people), the cumulative live-streaming time of the distributor reaches a threshold, or the like. In this way, the record condition may be a condition imposed on the parameters related to the live-streams, a condition imposed on the status of the distributor (e.g., winning an event), or a condition imposed on the behavior of the viewer (e.g., making more than a predetermined number of comments). When it is determined that the record condition is satisfied (YES in S518), the special gift processing unit 310 obtains a screenshot at that time during broadcast of the video data (S520).

When illustration is instructed (YES in S522), the special gift processing unit 310 converts the image of the received or obtained screenshot into an illustration (S524). The illustration may be realized by using a known image processing technique as described in "Actually easy! How to convert a photo into an illustration or painting style with Photoshop," URL: https://design-trekker.jp/design/photo-shop/turn-photos-into-illustlations/.

The special gift processing unit 310 generates a special gift based on the image of the screenshot received or obtained (S526). If the illustration is not performed, the special gift processing unit 310 generates an image of a special gift by embedding the ID of the giver viewer in the image of the screenshot. A new gift ID is then given to the image. When the illustration is performed, the special gift processing unit 310 uses the illustrated image as it is as an image of the special gift, and assigns a new gift ID to the image.

The gift delivering unit 312 gives points corresponding to the generated special gift to the distributor (S528). The gift delivering unit 312 updates the user DB 320 to add the points corresponding to the special gift are added to the points of the distributor specified by the distributor ID included in the gift usage signal received in step S502. The gift delivering unit 312 transmits the image of the special gift generated in step S526 to the distributor's user terminal 20 and the viewer's user terminal 30 (S530). The gift delivering unit 312 also registers special gift information in the gift DB 322 and the user DB 320. The user terminals 20 and 30 show the image of the special gift on the display during the reproduction of the video data related to the live-stream.

Figure 10:
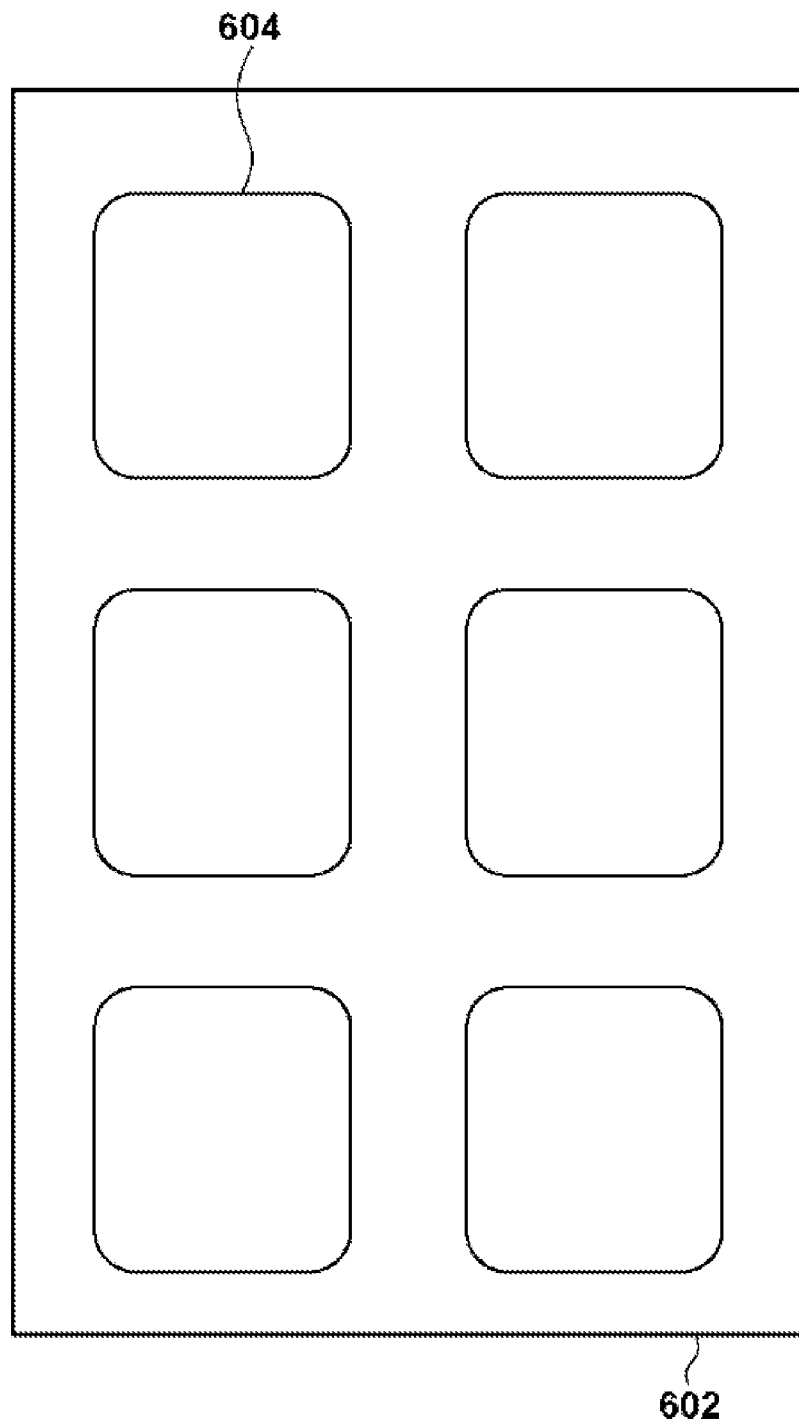
FIG. 10 is a representative screen image of a live streaming selection screen displayed on a display of a viewer's user terminal.

FIG. 10 is a representative screen image of the live-stream selection screen 602 displayed on the display of the viewer user terminal 30. The live-stream selection screen 602 includes thumbnails 604 indicating live-streams in the list of currently available live streams. The viewer-side UI control unit 202 generates the live-stream selection screen 602 based on the list of live-streams obtained from the server 10 and shows the screen on the display.

Figure 11:
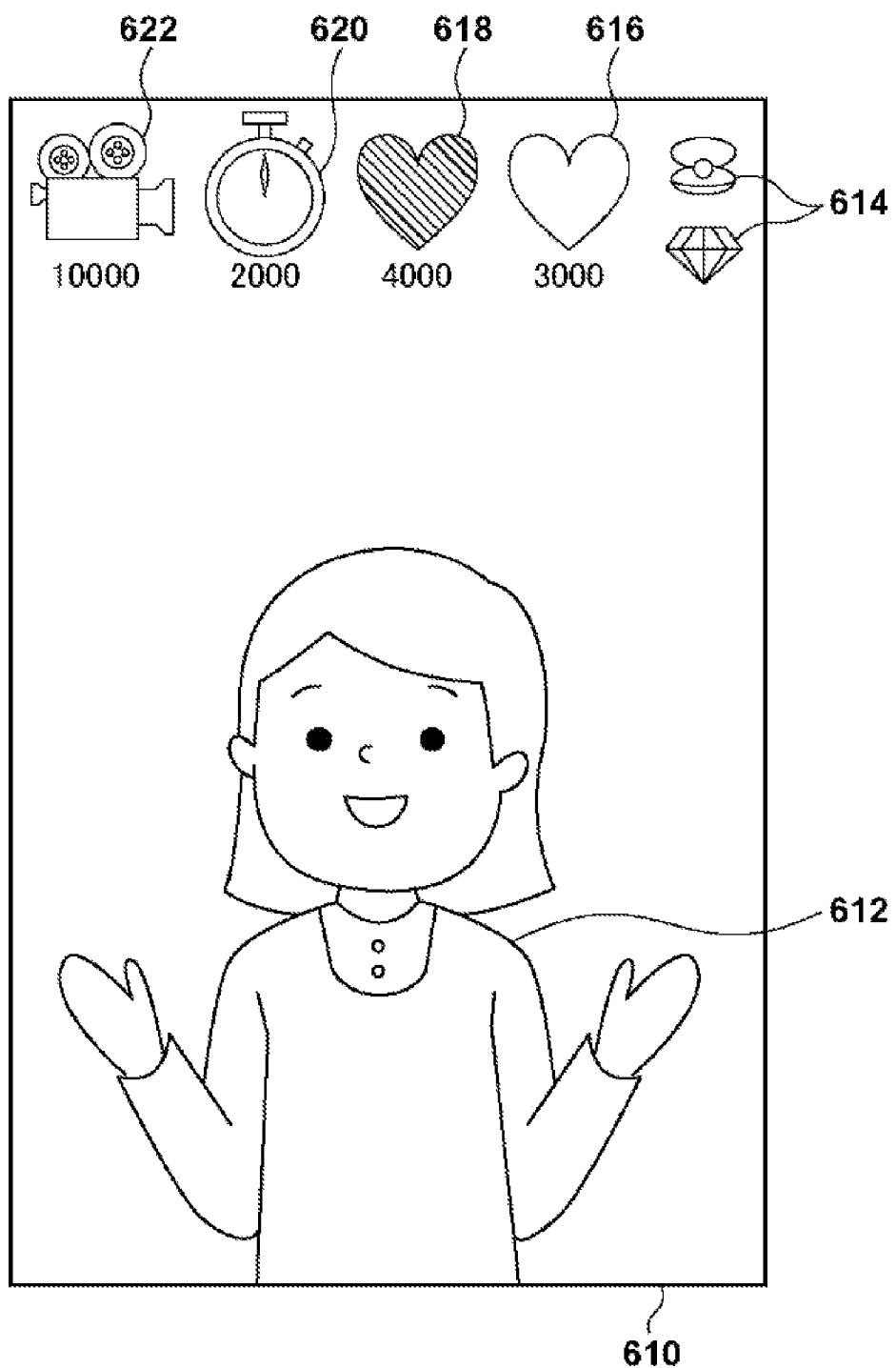
FIG. 11 is a representative screen image of a live streaming room screen displayed on the display of the viewer's user terminal.

FIG. 11 is a representative screen image of the live-stream selection screen 610 displayed on the display of the viewer user terminal 30. Once the viewer taps one of the thumbnails 604 on the live-stream selection screen 602 of FIG. 10, the live-streaming room screen 610 of FIG. 11 is shown on the display. The live-streaming room screen 610 includes a distributor image 612 obtained by reproducing the video data, and an image of an available gift list. The available gift list image includes a gift icon 614 for the normal gift, a gift icon 616 for the special gift identified by the gift ID "TD01"

of FIG. 8, and a gift icon 618 for the special gift identified by the gift ID "VE01" of FIG. 8, a special gift icon 620 identified by the gift ID "VD01" of FIG. 8, and a special gift gift icon 622 identified by the gift ID "SKK3" of FIG. 8.

Once a viewer taps the gift icon 616 of the special gift on the live-streaming room screen 610 of FIG. 11, the user terminal 30 accepts the designation of the special gift by the viewer. The user terminal 30 generates a gift usage signal including the gift ID (in this case, "TD01") of the designated special gift, and transmits it to the server 10 over the network NW. The user terminal 30 receives, from the server 10, a usage permission signal responding to the transmitted gift usage signal. The user terminal 30 allows the viewer to obtain a screenshot based on the usage permission signal. Specifically, the user terminal 30 causes the display to show a screenshot standby screen 624.

Figure 12:
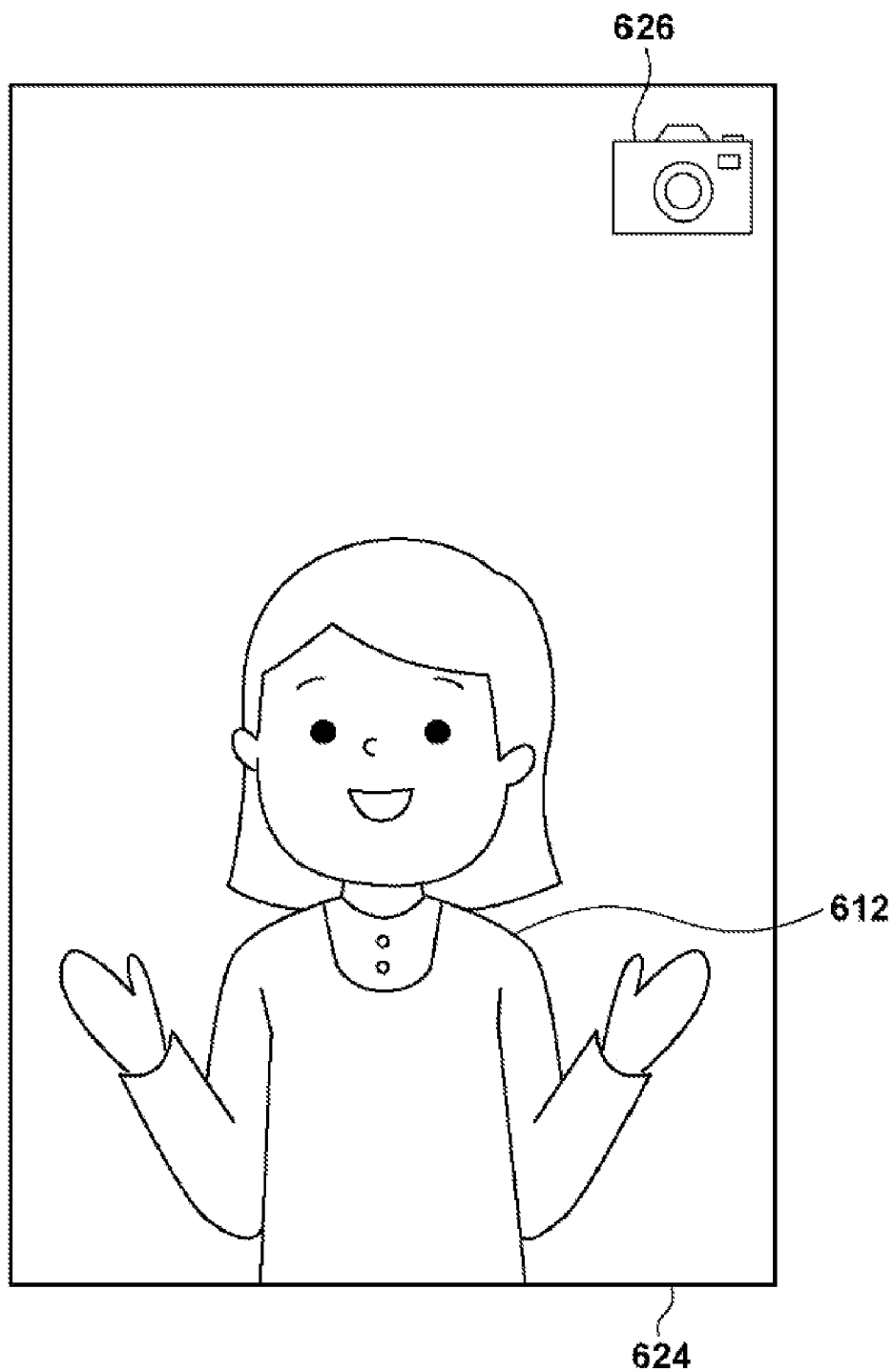
FIG. 12 is a representative screen image of a screenshot standby screen displayed on the viewer's user terminal display.

FIG. 12 is a representative screen image of the screenshot standby screen displayed on the viewer's user terminal display. The screenshot standby screen 624 has a distributor image 612 obtained by reproducing the video data, and a screenshot icon 626. The screenshot standby screen 624 is a screen for receiving an instruction from the user to record an image of a screenshot that is a part of the live-stream during reproduction of the video data related to the live-stream. The viewer waits for a moment that may be unique to the live-stream while watching the image 612 of the distributor, and when the moment comes, the viewer taps the screenshot icon 626. Upon detection of the tapping on the screenshot icon 626, the user terminal 30 generates a screenshot of the image 612 of the distributor at that time. Here, the viewer may be allowed to retake the screenshot.

The user terminal 30 transmits the generated screenshot image to the server 10. The server 10 generates a special gift image by embedding the viewer ID of the viewer who took the screenshot in the image of the screenshot. The server 10 transmits the generated special gift image to the user terminal 30. The user terminal 30 superimposes the received image of the special gift on the image of the live-stream and shows it on the display.

Figure 13:
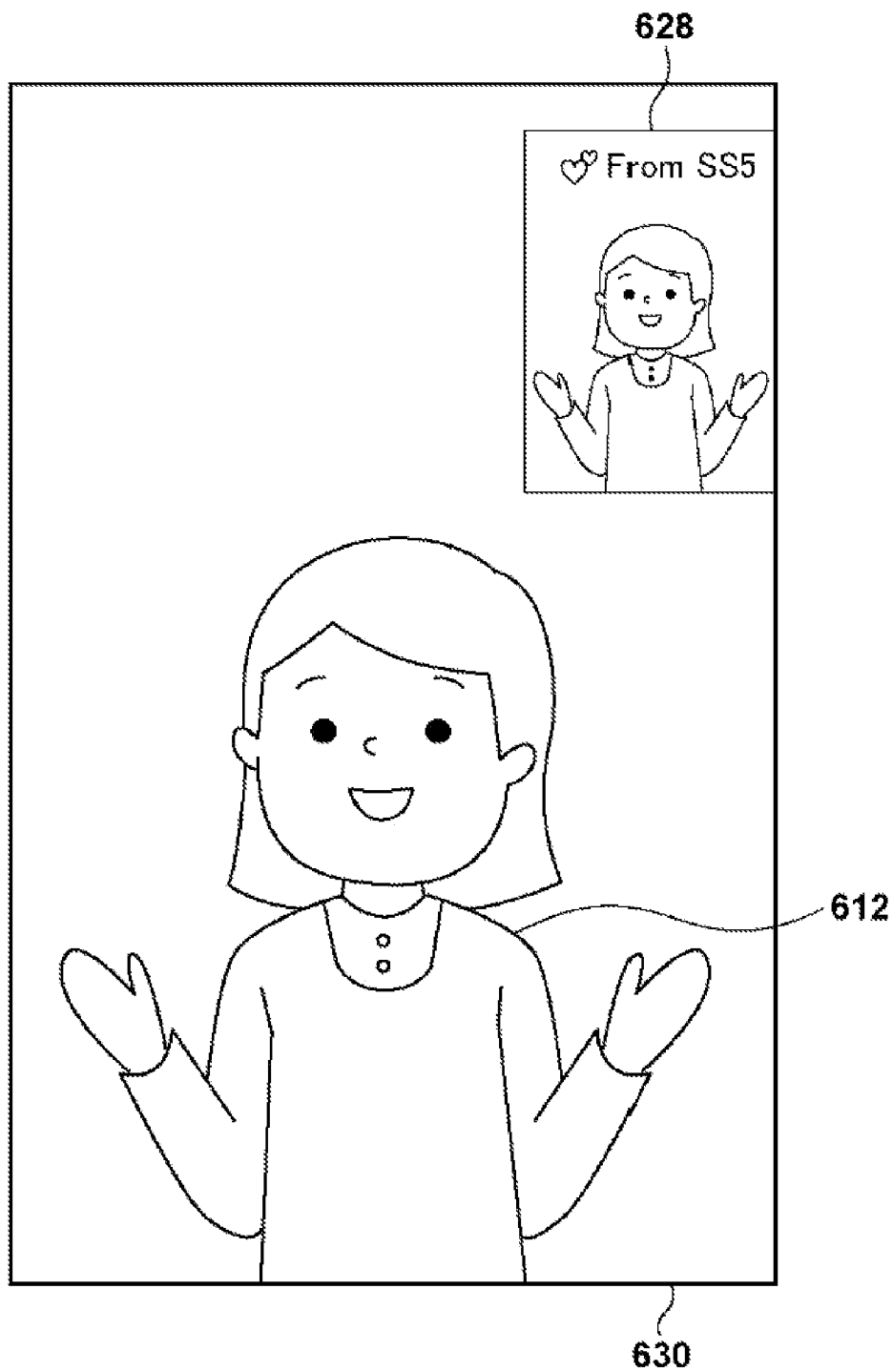
FIG. 13 is a representative screen image of a live streaming room screen displayed on the display of the viewer's user terminal.

FIG. 13 is a representative screen image of the live-stream selection screen 630 displayed on the display of the viewer user terminal 30. Once the viewer taps the screenshot icon 626 on the screenshot standby screen 624 of FIG. 12, the live-streaming room screen 630 of FIG. 13 is shown on the display. The live-streaming room screen 630 includes a distributor image 612 and a special gift image 628 displayed in association therewith. The image 628 of the special gift is displayed during the live-stream that has been being broadcast since the generation of the special gift. The image 628 of the special gift includes an image based on the image of the screenshot obtained by the viewer's instruction, and the viewer ID of the viewer. The special gift image 628 similarly appears on the user terminals of other viewers to whom the same live-stream is distributed and on the user terminal of the distributor of the same live-stream. By displaying the image 628 of the special gift in the live-streaming room of the distributor, the special moment in which the special gift is displayed in the room can be shared between the distributor and the viewer. In addition, by showing the viewer ID of the viewer who gave the special gift together with the gift, it is possible to inform to other viewers that the viewer is associated closer with the distributor relative to other viewers.

Figure 14:
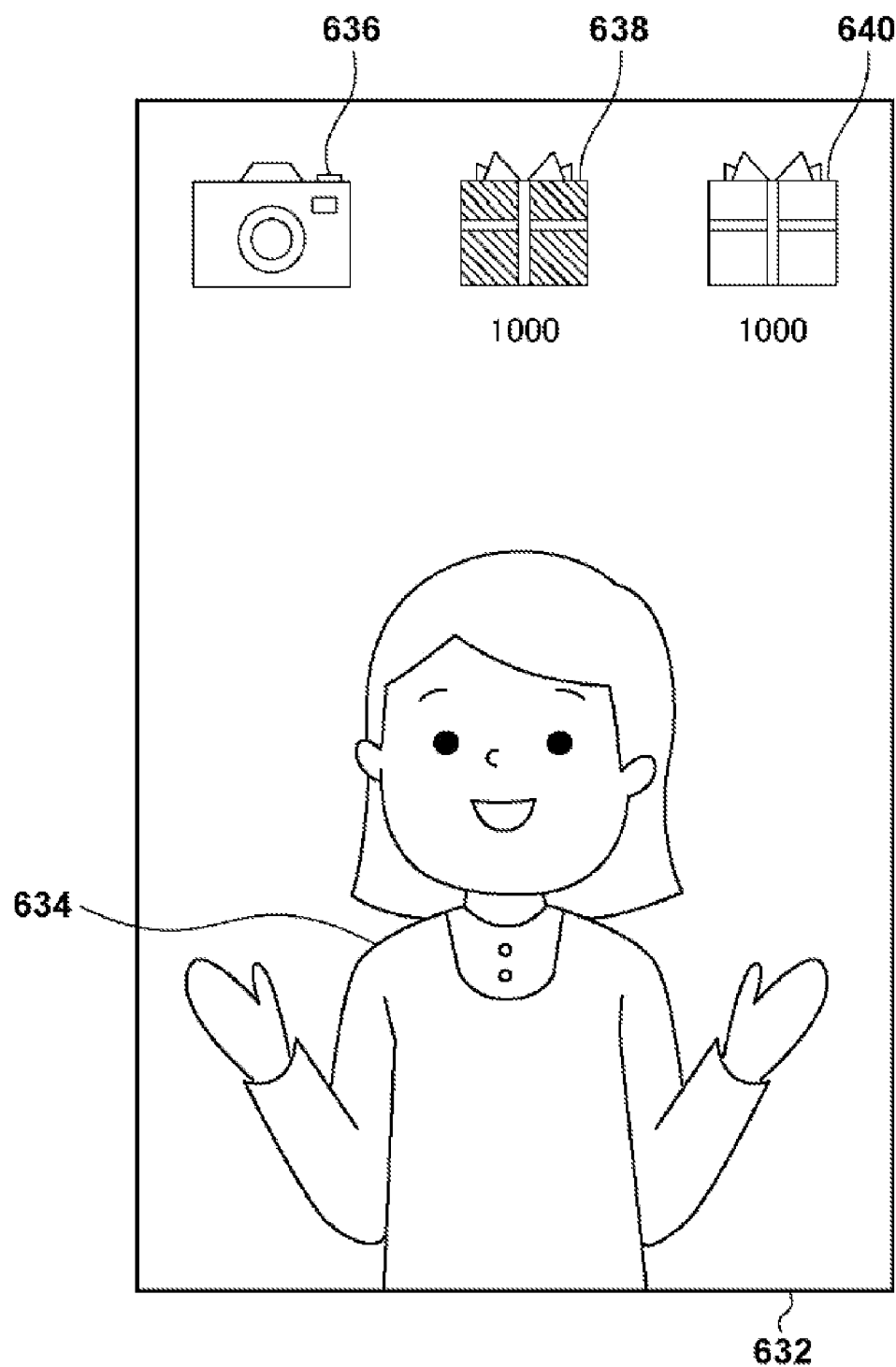
FIG. 14 is a representative screen image of a live streaming room screen displayed on a display of a distributor's user terminal.

FIG. 14 is a representative screen image of a live-streaming room screen 632 shown on the display of the distributor's user terminal. The live-streaming room screen 632 includes a distributor image 634 obtained by reproducing the video data that is transmitted to the server 10, a gift icon 636 of the special gift specified by the gift ID "SKK1" in FIG. 8, a gift icon 638 of the special gift specified by the gift ID "SKK4" in FIG. 8, and a gift icon 640 of the special gift specified by the gift ID "SKK5" in FIG. 8.

The gift icon 636 is an object for receiving an instruction from the distributor to record an image of a screenshot that is a part of the live-stream during reproduction of the video data related to the live-stream. The distributor waits for a moment that may be unique to the live-stream while watching the image 634 of the distributor himself/herself, and when the moment comes, the distributor taps the gift icon 636. Upon detection of the tapping on the gift icon 636, the user terminal 20 generates a screenshot of the image 634 of the distributor at that time. The user terminal 20 transmits, to the server 10, a special gift generation request that includes the generated screenshot image and the gift ID "SKK1". By referring to the gift DB 322, the server 10 obtains and executes the gift algorithm of the special gift specified by the gift ID included in the special gift generation request. Specifically, the server 10 generates an image of the special gift by embedding a predetermined text specified by the distributor in the screenshot image included in the special gift generation request. The server 10 converts the generated special gift image into a gift icon 642. The server 10 transmits the gift icon 642 to the user terminal 30 of the viewer. The user terminal 30 superimposes the received gift icon 642 on the image of the live-stream and shows it on the display.

Figure 15:
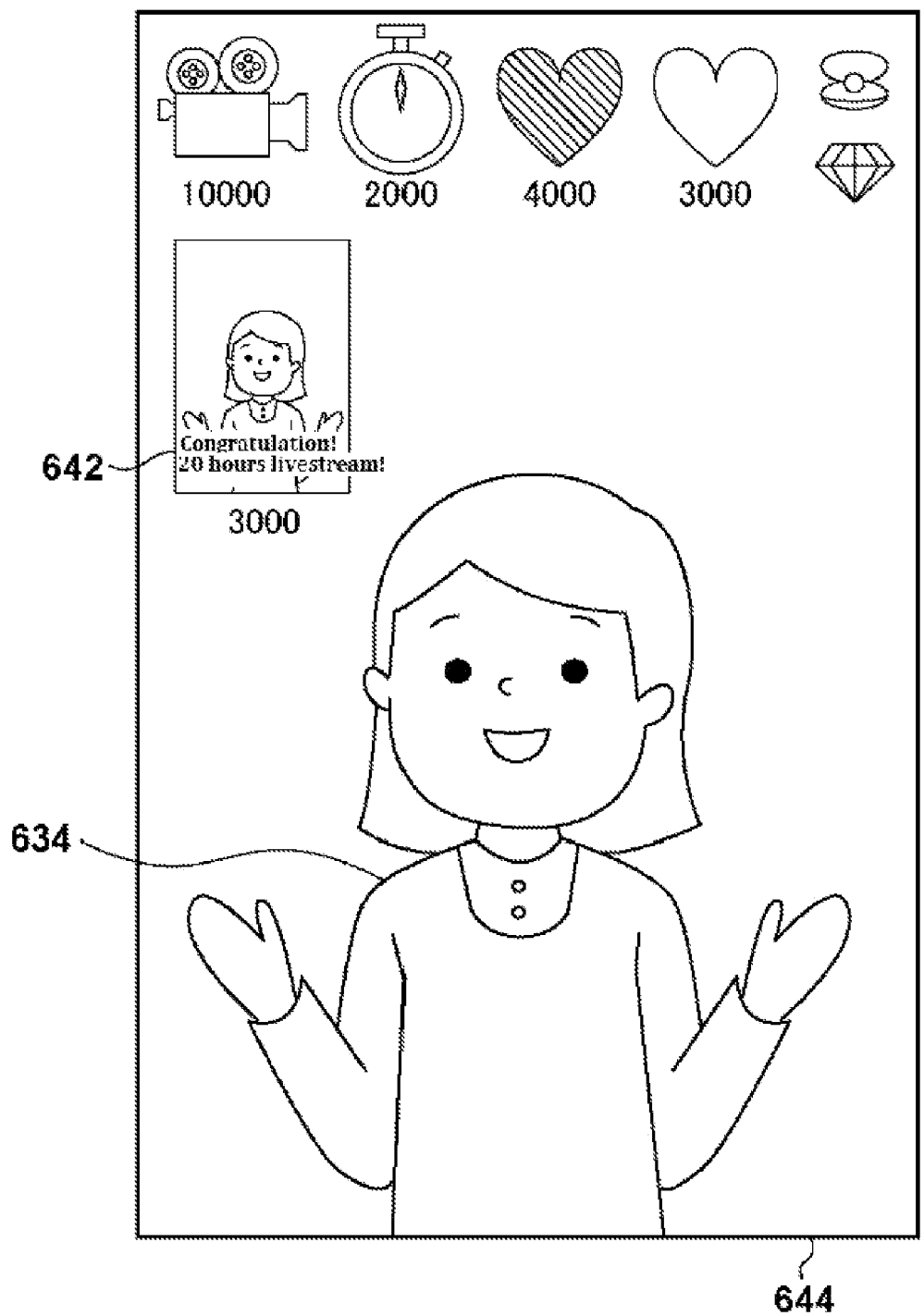
FIG. 15 is a representative screen image of a live streaming room screen displayed on the display of the viewer's user terminal.

FIG. 15 is a representative screen image of a live-stream selection screen 644 displayed on the display of the viewer user terminal 30. The live-streaming room screen 644 includes the distributor image 634 and the gift icon 642 received from the server 10. The distributor appeals to the viewers to purchase the special gift corresponding to the gift icon 642 during the live-stream. Once a viewer taps the gift icon 642 on the live-streaming room screen 644 of FIG. 15, the user terminal 30 accepts the designation of the special gift by the viewer. The user terminal 30 generates a gift usage signal including the gift ID (in this case, "SKK1") corresponding to the designated gift icon 642, and transmits it to the server 10 over the network NW. Upon receipt of the gift usage signal, the server 10 performs a payment process and a point giving process. The server 10 embeds the viewer ID included in the gift usage signal into the image of the special gift corresponding to the gift icon 642. The server 10 transmits the image 648 of the special gift so processed to the user terminals 20 and 30. The user terminals 20 and 30 superimpose the received image 648 of the special gift on the image of the live-stream and show it on the displays.

Figure 16:
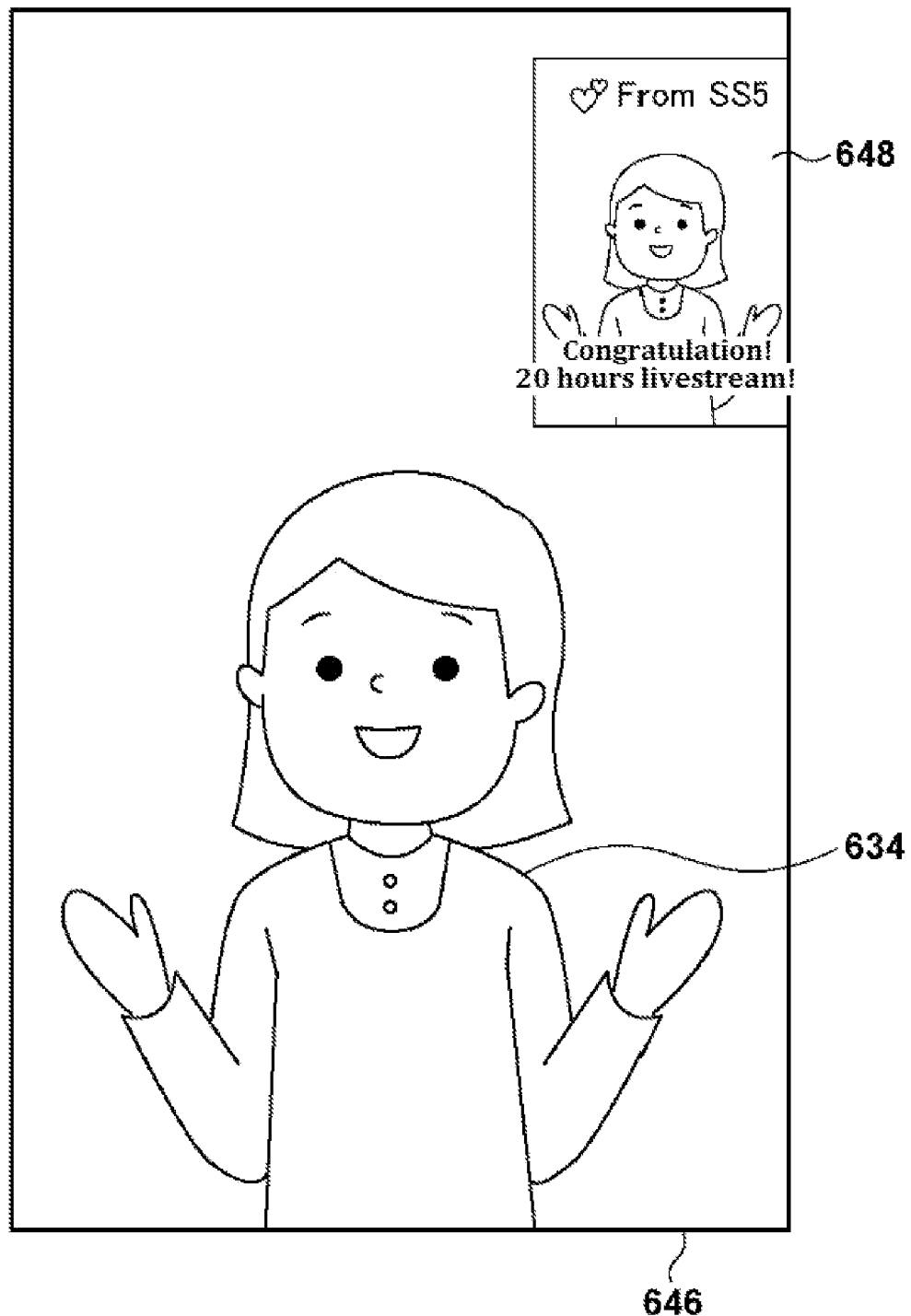
FIG. 16 is a representative screen image of a live streaming room screen displayed on the display of the viewer's user terminal.

FIG. 16 is a representative screen image of a live-stream selection screen 646 shown on the display of the viewer user terminal 30. Once the viewer taps the gift icon 642 on the live-stream selection screen 644 of FIG. 15, the live-streaming room screen 646 of FIG. 16 is shown on the display. The live-streaming room screen 646 includes a distributor image 634 and a special gift image 648 displayed in association therewith.

In the above embodiment, an example of a holding unit includes a hard disk or semiconductor memory. It is understood by those skilled in the art that each element or component can be realized by a CPU not shown, a module of an installed application program, a module of a system program, or a semiconductor memory that temporarily stores the contents of data read from the hard disk, and the like.

With the live-streaming system 1, a gift based on a part of the live-stream can be generated during the live-stream, and the gift can be given to the distributor during the same live-stream. This makes it possible to converts events and moments unique to live-streaming into gifts instantly, making the live-streaming much more exciting and increasing the engagement of the viewers and the distributor with the live-stream. In addition, decorating the live-streaming room with such gifts enables further personalization of the live-streaming room, and thus contributes to increasing the diversity of such live-streaming rooms.

The moments that are unique to the live-streaming are, for example, the moment when the distributor wins the first place in an event held on the live-streaming platform, the moment when the distributor gives a perfect performance, the moment when cards are laid out on the table and the hand is held over the crystal in the case of tarot reading, or the moment when the distributor wins in the case of game play.

In addition, the live-streaming system 1 enables automatic generation of special gifts based on predetermined conditions. This makes it possible to more accurately capture moments that are difficult to specify manually, for example, the moment the distributor reaches a milestone, and to converts the moment into a gift.

In addition, the live-streaming system 1 of the embodiment allows viewers to generate special gifts without paying for the gifts when they are members of the distributor's army. This allows the viewers in the distributor's army to give the special gifts unlimitedly, thus promoting the development of a culture unique to live-streaming, such as "always throw a special gift at a certain moment specific to the distributor." Alternatively, for this purpose, the special gifts can be made as free gifts with no points and no payment. In this case, although no points are given to the distributor, it can greatly increase the excitement of the live-stream.

<Hardware Configuration Example>

Figure 17:
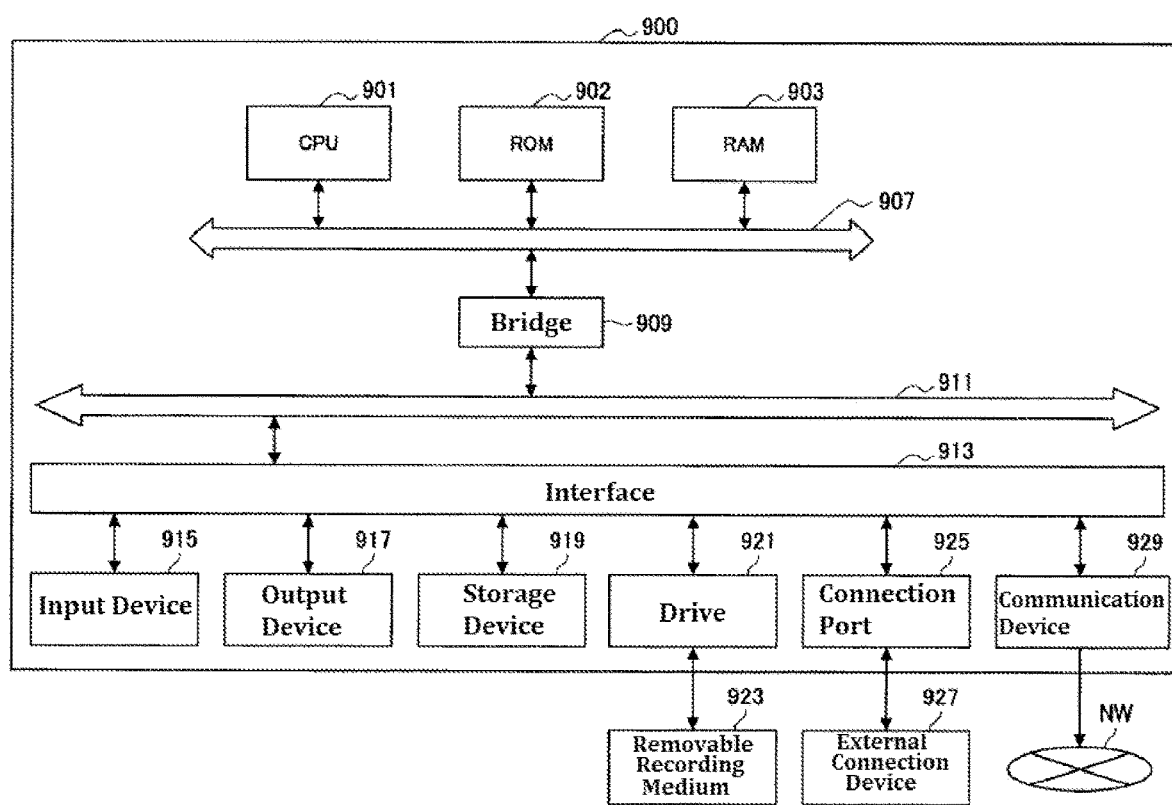
FIG. 17 is a block diagram showing an example of a hardware configuration of an information processing device according to the embodiment.

Referring to FIG. 17, the hardware configuration of the information processing device will be now described. FIG. 17 is a block diagram showing an example of a hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 903, and RAM (Random Access Memory) 905. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 903, the RAM 905, the storage device 919, or the removable recording medium 923. For example, the CPU 901 controls the overall operation of each functional unit included in the server 10 and the user terminals 20 and 30 in the embodiment. The ROM 903 stores programs, calculation parameters, and the like used by the CPU 901. The RAM 905 serves as a primary storage that stores a program used in the execution of the CPU 901, parameters that appropriately change in the execution, and the like. The CPU 901, ROM 903, and RAM 905 are interconnected to each other by a host bus 907 which may be an internal bus such as a CPU bus. Further, the host bus 907 is connected to an external bus 911 such as a PCI (Peripheral Component Interconnect/Interface) bus via a bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing unit 900 as text, video such as images, or sound such as audio.

The storage device 919 is a device for storing data configured as an example of a storage unit of the information processing equipment 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for a removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 905. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is an imaging element such as a CCD (Charge Coupled Device) or CMOS (Complementary Metal Oxide Semiconductor), and a device that captures an image of the real space using various elements such as lenses for controlling image formation of a subject on the imaging element to generate the captured image. The image capturing device may capture a still image or may capture a moving image.

The configuration and operation of the live-streaming system 1 in the embodiment have been described. This embodiment is a merely example, and it is understood by those skilled in the art that various modifications are possible for each component and a combination of each process, and that such modifications are also within the scope of the present disclosure.

In the above embodiment described with reference to FIGS. 11, 12, and 13, the special gift is generated by taking a screenshot of the live-stream by the viewer. But the embodiment is not limited to this. For example, the server 10 may be configured to allow the special gift generated in such a way to be purchased again by the viewer or other viewers. In this case, after the live-streaming room screen 630 of FIG. 13 is shown on the display of the user terminal 30 of the viewer, the viewer performs user input for requesting the display of the gift via the input means of the user terminal 30. Upon receipt of this user input, the input information transmission unit 206 of the user terminal 30 generates a gift information request and transmits it to the server 10. Upon receipt of the gift information request, the relay unit 304 of the server 10 refers to the gift DB 322 and specifies available gift IDs. At this time, the relay unit 304 determines whether the special gift "SPG01" that has been generated through the processes of FIGS. 11, 12, and 13 and registered in the gift DB322 is usable by referring the user DB320. When the special gift "SPG01" is registered as a special gift given to the distributor identified by the distributor ID (the distributor of the live-stream being viewed by the viewer who has transmitted the gift information request) included in the gift information request, the relay unit 304 determines that the special gift "SPG01" can be used, otherwise it determines that it is not available. The relay unit 304 generates a gift information response including the gift IDs that have been determined as available and transmits it to the user terminal 30. The superimposed information generation unit 204 of the user terminal 30 includes, into the frame image, an image of a usable gift list that lists the gift icon images specified by the gift IDs included in the gift information response. The viewer-side UI control unit 202 displays the video image on which the frame image is superimposed on the display.

Figure 18:
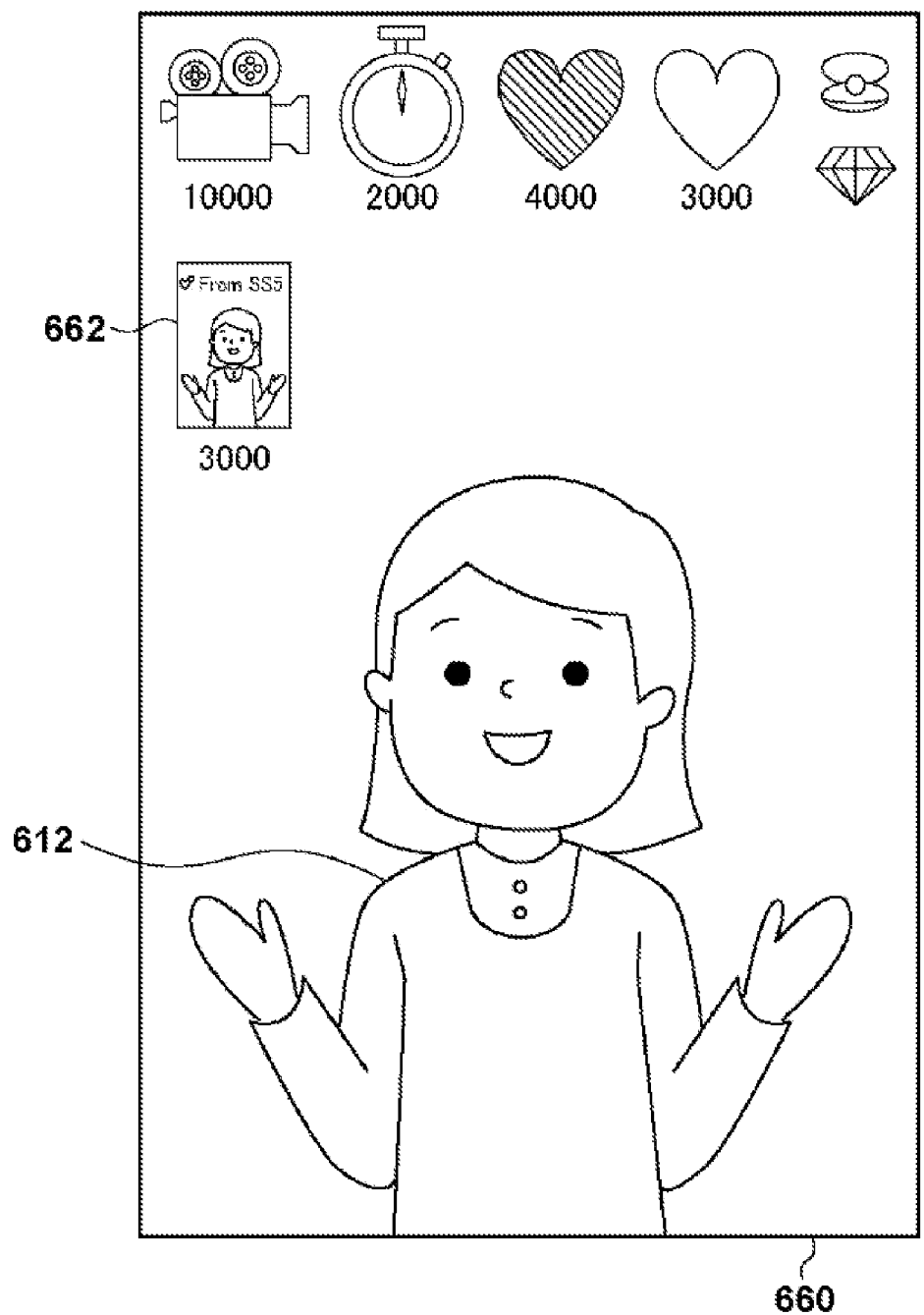
FIG. 18 is a representative screen image of a live streaming room screen displayed on the display of the viewer's user terminal.

FIG. 18 is a representative screen image of a live-streaming room 660 shown on the display of the viewer user terminal 30. The live-streaming room screen 660 includes a distributor image 612 obtained by reproducing the video data, and an image of an available gift list. The available gift list image has a gift icon 662 of the special gift identified by the gift ID "SPG01". Once the viewer taps the gift icon 662 on the live-streaming room screen 660 of FIG. 18, the user terminal 30 accepts the designation of the special gift icon 662 by the viewer. The user terminal 30 generates a gift usage signal including the gift ID (in this case, "SPG01") corresponding to the designated gift icon 662, and transmits it to the server 10 over the network NW. Upon receipt of the gift usage signal, the server 10 performs a payment process and a point giving process. The server 10 transmits the image 628 of the special gift "SPG01" to the user terminals 20 and 30. The user terminals 20 and 30 superimpose the received image 628 of the special gift on the image of the live-stream and show it on the displays.

Figure 19:
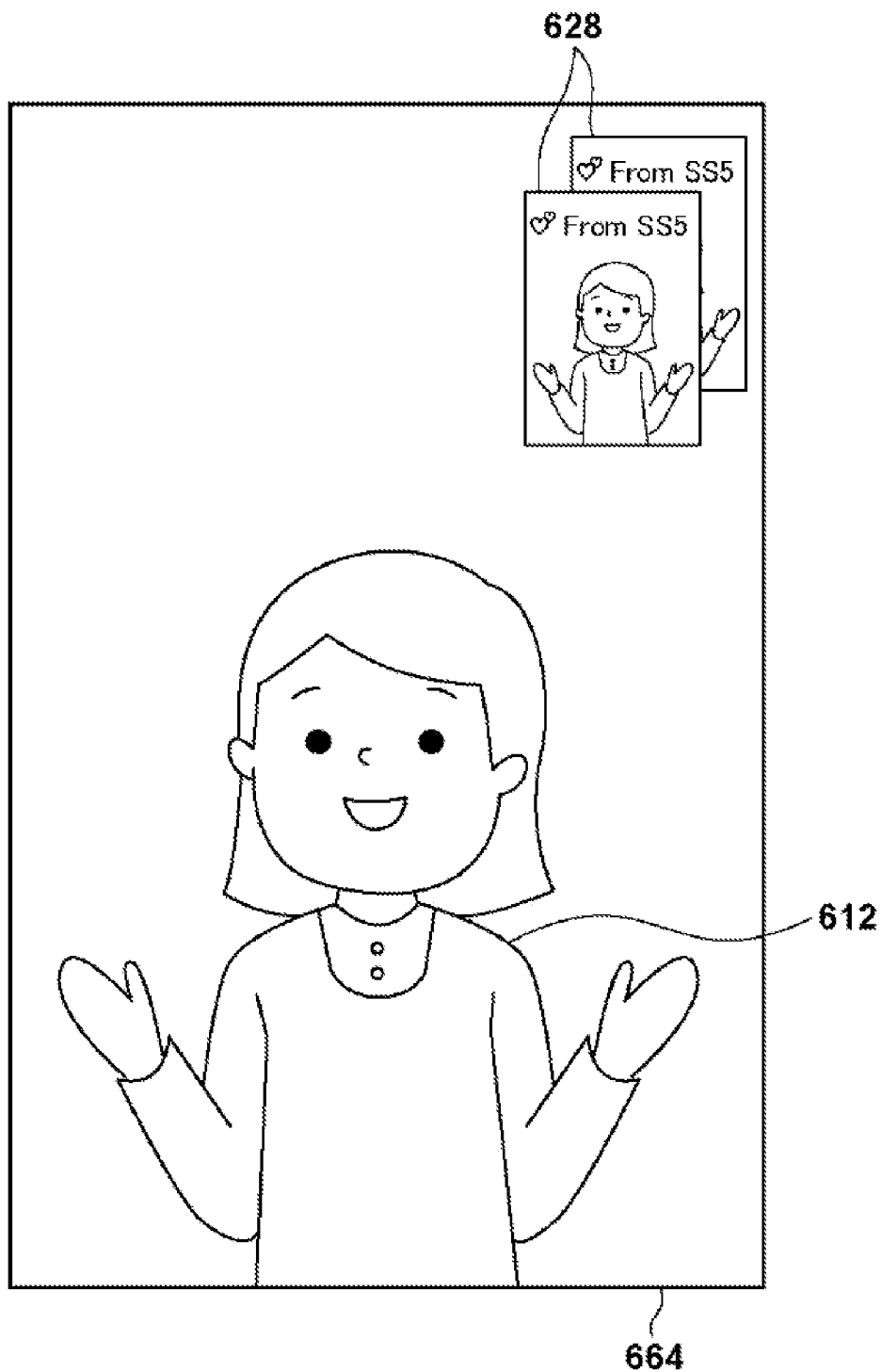
FIG. 19 is a representative screen image of a live streaming room screen displayed on the display of the viewer's user terminal.

FIG. 19 is a representative screen image of a live-stream selection screen 664 shown on the display of the viewer user terminal 30. Once the viewer taps the gift icon 662 on the live-stream selection screen 660 of FIG. 18, the live-streaming room screen 664 of FIG. 19 is shown on the display. The live-streaming room screen 664 includes the distributor image 612 and two or more special gift images 628 displayed in association therewith. The live-streaming room screen 664 displays the images 628 of the same number of special gifts as were given to the distributor. In this way, it is possible to indicate favors from other viewers for the special gift generated by one viewer. In addition, when a viewer purchases the same special gift more than once, it can indicate the strength of the viewer's feeling toward the moment that the special gift represents.

In this modification example, it may be configured to display not only the special gift generated during the live-stream currently being delivered, but also a special gift generated in another past live-stream by the same distributor, and such a gift may be selectable.

A modification example of giving a paid gift from a distributor to a specific viewer will be described. Once the distributor taps the gift icon 640 of the special gift "SKK5" on the live-streaming room screen 632 of FIG. 14, the user terminal 20 accepts the designation of the special gift by the distributor. The user terminal 20 generates a gift usage signal that includes the gift ID (in this case, "SKK5") of the designated special gift, and transmits it to the server 10 over the network NW. By referring to the gift DB 322, the server 10 obtains and executes the gift algorithm of the special gift specified by the gift ID included in the received gift usage signal. Specifically, the server 10 refers to the stream DB 316 to determine the viewer IDs of the viewers who are currently watching the live-stream specified by the stream ID included in the gift usage signal received (from the distributor). The server 10 obtains the information related to the specified viewer ID by referring to the user DB 320. The server 10 generates viewer list information including the specified viewer IDs and the obtained information, and transmits the viewer list information to the user terminal 20 of the distributor. In this example, the case in which the recipient viewers are selected from among the viewers of the live-stream currently being distributed by the distributor is described. In other examples, the recipient viewers may be selected from among all the users of the live-streaming platform registered in the user DB 320.

Figure 20:
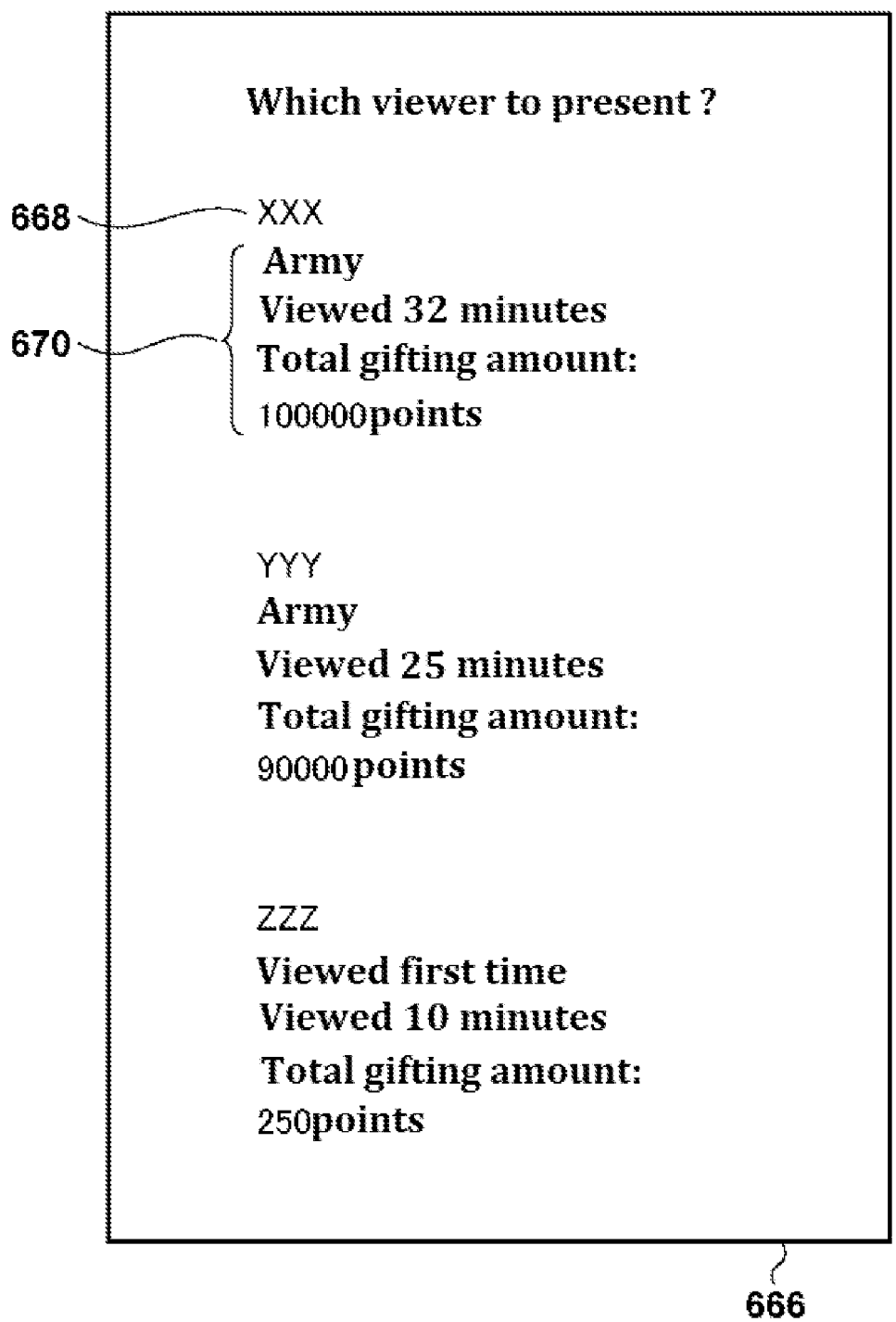
FIG. 20 is a representative screen image of a viewer selection screen displayed on the display of the distributor's user terminal.

Based on the received viewer list information, the user terminal 20 generates a viewer selection screen 666 for the distributor to select viewers to whom the special gift should be given, and shows the screen on the display. FIG. 20 is a representative screen image of the viewer selection screen 666 shown on the display of the distributor's user terminal 20. The viewer selection screen 666 shows the viewer IDs 668 of the viewers who are currently watching the live-stream of the distributor in association with the information 670 of those viewers. On the viewer selection screen 666, the viewer information may be sorted and displayed according to a predetermined criterion (for example, in descending order of total gifting amount, longest viewing time, etc.). The distributor taps the viewer ID 668 or information 670 of the viewer to whom the distributor wishes to give the special gift. The user terminal 20 determines the viewer designated by the distributor through tapping as the recipient of the special gift. The user terminal 20 generates a public gift presenting request that includes the viewer ID of the designated viewer and sends the request to the server 10. Upon receiving the public gift presenting request, the server 10 updates the user DB 320 to deduct the points equivalent to the special gift specified by the gift ID "SKK5" included in the public gift presenting request from the distributor's points. The server 10 updates the user DB 320 such that the points of the viewer specified by the viewer ID included in the public gift presenting request are increased by the points of the special gift "SKK5" given to the viewer. The server 10 generates a text indicating that the distributor has given the gift to the viewer, and transmits the text to the user terminal 20 of the distributor and to the user terminals of the viewers including the viewer of the recipient. The user terminal 30 of the viewer superimposes and displays the received text as a comment on the image of live-stream.

Figure 21:
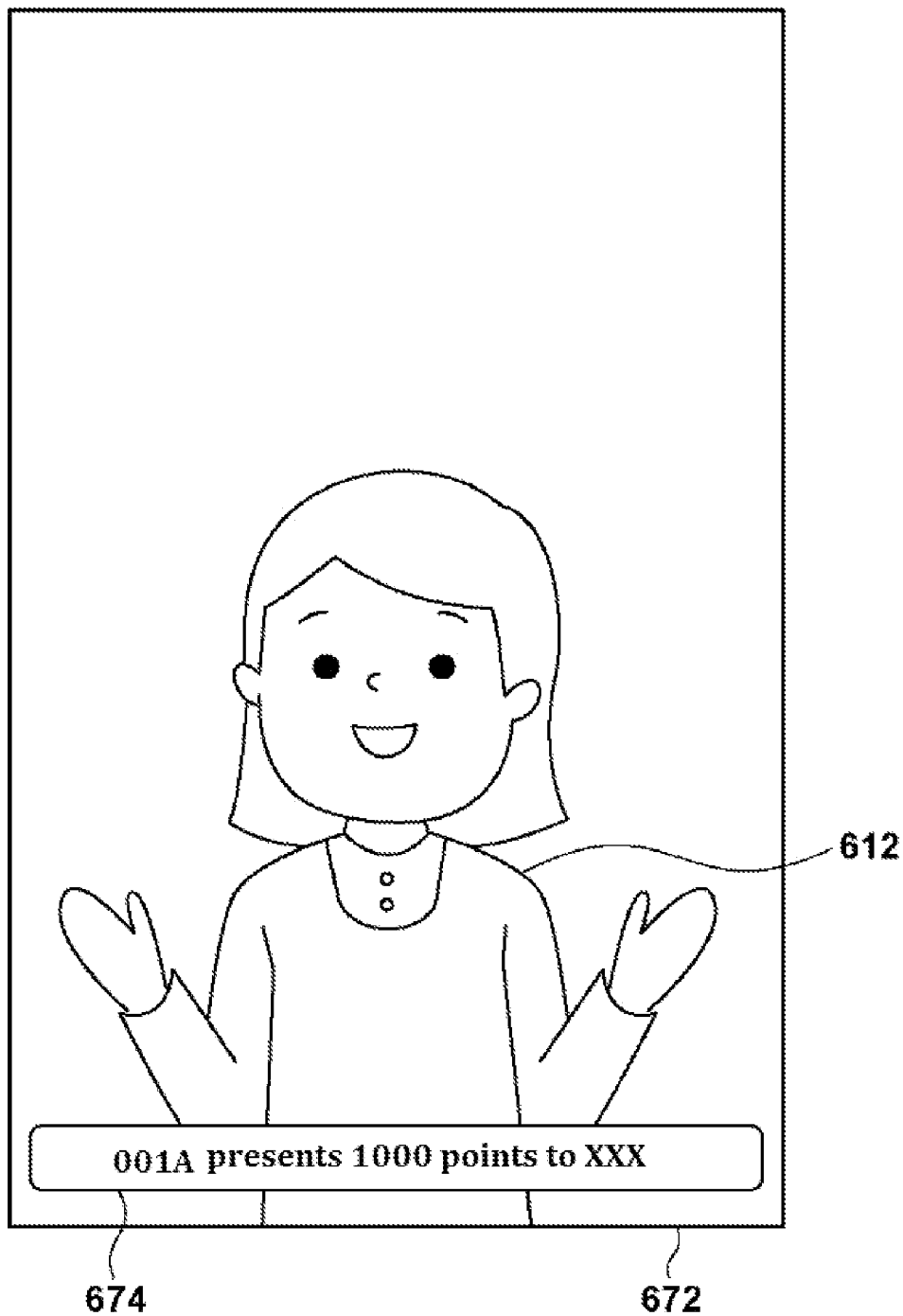
FIG. 21 is a representative screen image of a live streaming room screen displayed on the display of the viewer's user terminal.

FIG. 21 is a representative screen image of a live-streaming room screen 672 shown on the display of the viewer user terminal 30. On the live-streaming room screen 672, a comment 674 is superimposed and shown on the image 612 of the distributor. The comment 674 includes a text received from the server 10 indicating that the distributor has given the viewer a gift. This comment 674 is displayed on the user terminals 30 of all the viewers who are watching the live-stream.

When the distributor taps the gift icon 638 of the special gift "SKK4" on the live-streaming room screen 632 of FIG. 14, the same processing as described above for the special gift "SKK5" is executed. The difference is that the text indicating that the distributor has given the gift to the viewer is transmitted only to the user terminal 30 of the viewer to whom the gift is given, and is displayed only on the user terminal 30 of the viewer.

Since the distributor is able to give a gift(s) to a viewer(s), it is possible to help the distributor to build a closer relationship with his/her viewers. For example, such gifting can be used as a tool to promote the distributor himself/herself to influential viewers.

In the embodiment, the case where a viewer gives a special gift to a distributor while the viewer is watching the live-stream has been described, but the present disclosure is not limited to this. For example, a viewer who has purchased a special gift may become a distributor and the distributor may advertise and sell the special gift in his/her live-stream. For example, in the example of FIG. 7, it is assumed that the user with the user ID "SSS" purchased and gave the special gift "SPG01" in a live-stream performed by the user with the user ID "001A" in the past. A viewer of a live-stream performed by the user of the user ID "SSS" may request display of the gift via the input means of the user terminal 30. Upon receipt of this user input, the input information transmission unit 206 of the user terminal 30 generates a gift information request and transmits it to the server 10. Upon receipt of the gift information request, the relay unit 304 of the server 10 refers to the gift DB 322 and specifies usable gift IDs. At this time, the relay unit 304 determines whether the special gift "SPG01" is available by referring the user DB320. When the special gift "SPG01" is registered as a special gift that has been given by the distributor identified by the distributor ID "SSS" included in the gift information request to other user, the relay unit 304 determines that the special gift "SPG01" can be used. The relay unit 304 generates a gift information response including the gift IDs that have been determined as available and transmits it to the user terminal 30. The superimposed information generation unit 204 of the user terminal 30 includes, into the frame image, an image of a usable gift list that lists the gift icon images specified by the gift IDs included in the gift information response. The viewer-side UI control unit 202 displays the video image on which the frame image is superimposed on the display.

Figure 22:
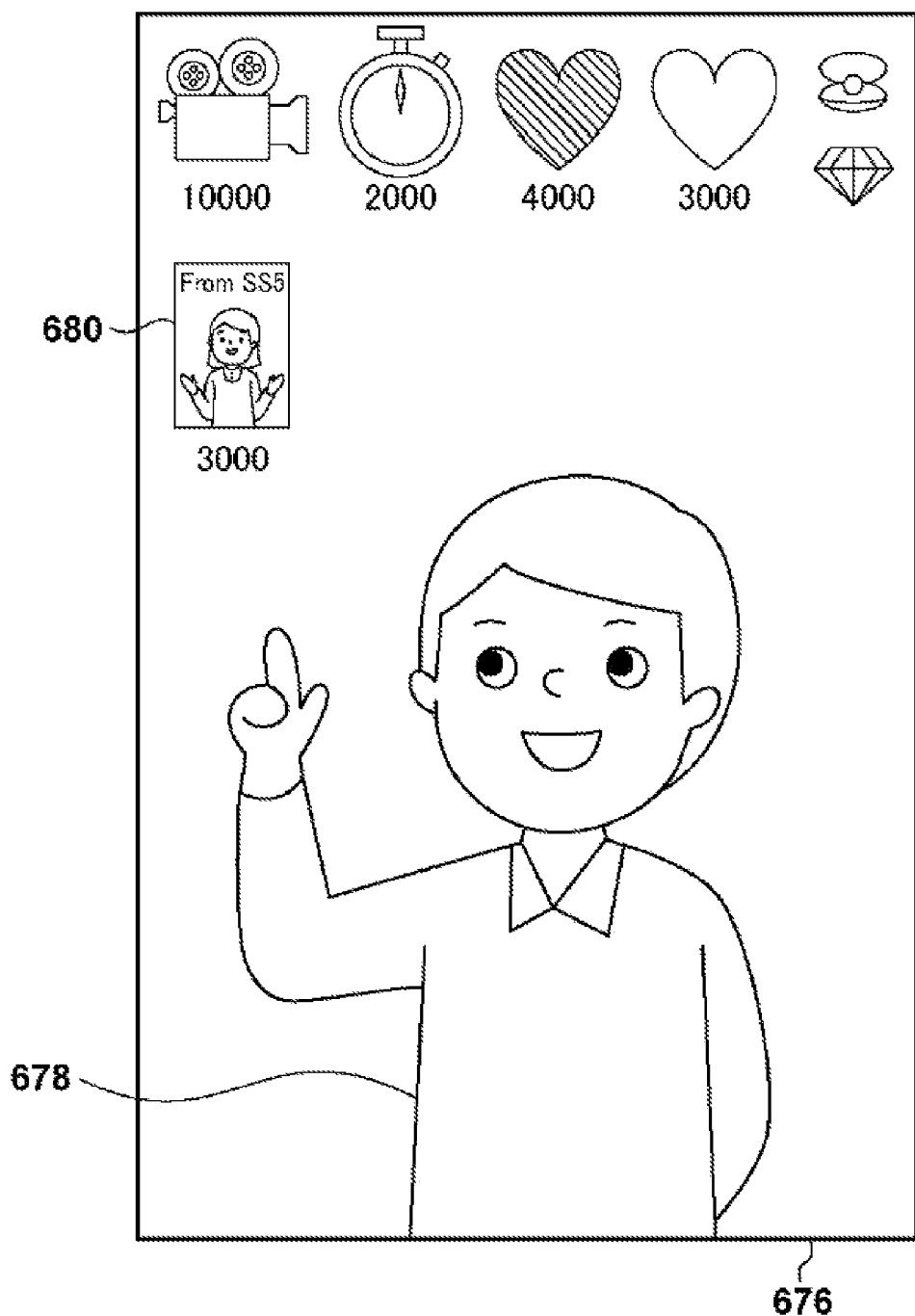
FIG. 22 is a representative screen image of a live streaming room screen displayed on the display of the viewer's user terminal.

FIG. 22 is a representative screen image of a live-streaming room screen 676 shown on the display of the viewer user terminal 30. The live-streaming room screen 676 includes an image 678 of the distributor "SSS" obtained by reproducing the video data, and an image of an available gift list. The available gift list image has a gift icon 680 of the special gift identified by the gift ID "SPG01". On the live-streaming room screen 676, the distributor "001A" to whom the special gift "SPG01" indicated by the gift icon 680 is given is different from the distributor "SSS" of the distributor image 678 being reproduced in the live-streaming room screen 676. The distributor "SSS" of the giver of the special gift "SPG01" indicated by the gift icon 680 is identical to the distributor "SSS" of the distributor image 678 being reproduced on the live-streaming room screen 676. It can be known from the live-streaming room screen 676 that the distributor "SSS" supports another distributor "001A" and asks his/her viewers to purchase the special gift "SPG01" for the distributor "001A".

Once the viewer taps the gift icon 680 on the live-streaming room screen 676 of FIG. 22, the user terminal 30 accepts the designation of the special gift icon 680 by the viewer. The user terminal 30 generates a gift usage signal including the gift ID (in this case, "SPG01") corresponding to the designated gift icon 680, and transmits it to the server 10 over the network NW. Upon receipt of the gift usage signal, the server 10 updates the user DB 320 to deduct the points equivalent to the special gift specified by the gift ID "SPG01" included in the gift usage signal from the viewer's points. The server 10 updates the user DB 320 to increase the points of the user to whom the special gift "SPG01" is given (in this case, the user identified by the user ID "001A") by the points of the special gift "SPG01". Alternatively, the points of the gift may be apportioned between the user "001A" to whom the special gift "SPG01" is given and the live-stream distributor "SSS" from whom the special gift "SPG01" has been purchased. The server 10 transmits, to the user terminal 20 of the user "001A" to whom the special gift "SPG01" is given, a text indicating that the special gift "SPG01" has been sold in the live-stream of the distributor "SSS" and an image 628 of the special gift "SPG01". The user terminal 20 superimposes and shows the received text as a comment on the image of the live-stream.

Figure 23:
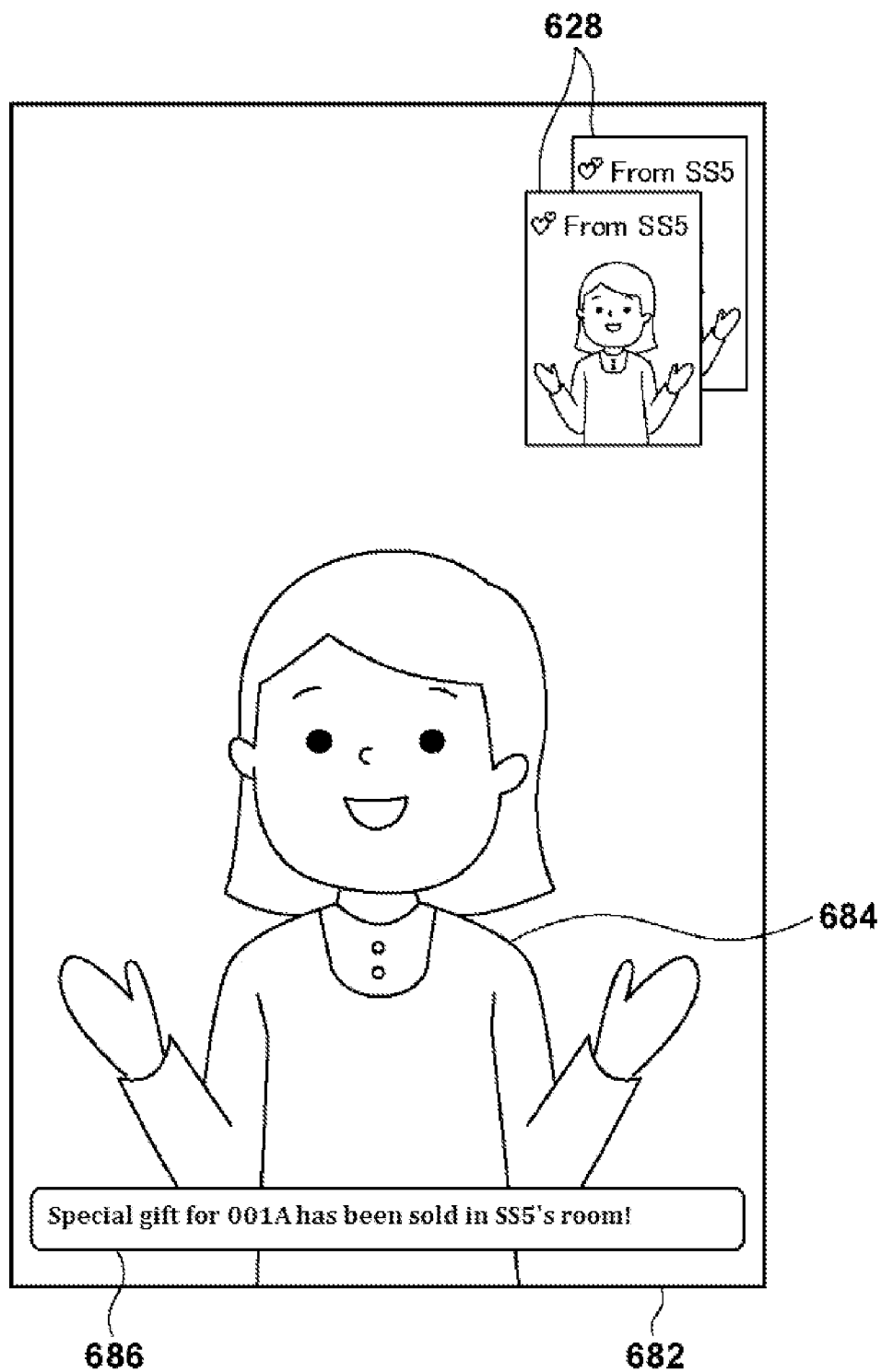
FIG. 23 is a representative screen image of a live streaming room screen displayed on the display of the distributor's user terminal.

FIG. 23 is a representative screen image of a live-streaming room screen 682 shown on the display of the distributor's user terminal. The live-streaming room screen 682 includes the image 684 of the distributor "001A" obtained by reproducing the video data, the images 628 of the special gifts as many as the number of the presented special gifts, and a comment 686 superimposed on the image 684 of the distributor "001A". The comment 686 includes a text received from the server 10 indicating that the special gift "SPG01" has been sold in the live-stream of the distributor "SSS". This comment 686 is displayed on the user terminals 30 of all the viewers who are watching the live-stream of the distributor "001A". In this way, even when the giver of the special gift is performing live-stream and cannot participate in the live-stream of the recipient's distributor, the giver of the special gift can support the recipient's distributor through his/her own live-stream.

In the embodiment, the server 10 may be configured to allow the user terminals 20 and 30 to view the information on the special gifts given by a user and/or given to the user by requesting the server 10 from the user terminals 20 and even when the live-stream is not performed.

The conversion rate from the value equivalent to the gift to the points of the gift in the embodiment is merely example, and the conversion rate may be appropriately set by the administrator of the live-streaming system 1, for example.

The technical idea according to the embodiment may be applied to live commerce or virtual live-streaming using an avatar that moves in synchronization with the movement of the distributor instead of the image of the distributor.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present disclosure.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the user terminal where the video data is reproduced may be performed by the server 10 or may be performed by the user terminal where the video data is generated. In addition, at least a part of the generation of a special gift may be performed on the user terminal.

What is claimed is:

1. A server, comprising:
    a relay unit relaying video data related to a live-stream from a user terminal where the video data is generated to a user terminal where the video data is reproduced;
    a generation unit generating electronic data based on a part of the live-stream recorded in accordance with an instruction by a user of the user terminal where the video data is generated while the video data is reproduced; and
    a reception unit receiving a designation of the generated electronic data by a user of the user terminal where the video data is reproduced while the video data is reproduced.

2. The server of claim 1, wherein the reception unit causes a display of the user terminal where the video data is reproduced to display an object to receive the designation of the generated electronic data while the video data is reproduced.

3. The server of claim 1, further comprising a display unit causing a display of the user terminal where the video data is generated to display an object to receive the instruction to record the part of the live-stream while the video data is reproduced.

4. The server of claim 1, further comprising an enable unit enabling the user of the user terminal where the video data is reproduced to be more prominent in the live-stream as the number of designations of the generated electronic data by said user increases.

5. A method, comprising:
    relaying video data related to a live-stream from a user terminal where the video data is generated to a user terminal where the video data is reproduced;
    generating electronic data based on a part of the live-stream recorded in accordance with an instruction by a user of the user terminal where the video data is generated while the video data is reproduced; and
    receiving a designation of the generated electronic data by a user of the user terminal where the video data is reproduced while the video data is reproduced.

6. The method of claim 5, wherein the receiving includes causing a display of the user terminal where the video data is reproduced to display an object to receive the designation of the generated electronic data while the video data is reproduced.

7. The method of claim 5, further comprising causing a display of the user terminal where the video data is generated to display an object to receive the instruction to record the part of the live-stream while the video data is reproduced.

8. The method of claim 5, further comprising enabling the user of the user terminal where the video data is reproduced to be more prominent in the live-stream as the number of designations of the generated electronic data by said user increases.

* * * * *